(12) United States Patent
Harrang et al.

(10) Patent No.: US 7,921,196 B2
(45) Date of Patent: Apr. 5, 2011

(54) ADAPTIVE FILE DELIVERY WITH TRANSPARENCY CAPABILITY SYSTEM AND METHOD

(75) Inventors: Jeffrey P. Harrang, Sammamish, WA (US); David Gibbons, Redmond, WA (US); Kamyar Moinzadeh, Bellevue, WA (US)

(73) Assignee: Opanga Networks, Inc., Seattle, WA (US)

( * ) Notice: Subject to any disclaimer, the term of this patent is extended or adjusted under 35 U.S.C. 154(b) by 0 days.

(21) Appl. No.: 12/167,154

(22) Filed: Jul. 2, 2008

(65) Prior Publication Data

US 2009/0024749 A1 Jan. 22, 2009

Related U.S. Application Data

(63) Continuation-in-part of application No. 11/278,809, filed on Apr. 5, 2006, now Pat. No. 7,500,010.

(60) Provisional application No. 60/668,864, filed on Apr. 7, 2005.

(51) Int. Cl.
  *G06F 15/173* (2006.01)
  *G06F 15/16* (2006.01)
(52) U.S. Cl. .................. 709/223; 709/231; 709/238
(58) Field of Classification Search .......... 709/223–224, 709/231, 238
  See application file for complete search history.

(56) References Cited

U.S. PATENT DOCUMENTS

| | | | |
|---|---|---|---|
| 6,311,065 B1 * | 10/2001 | Ushiki et al. | 455/440 |
| 6,339,785 B1 * | 1/2002 | Feigenbaum | 709/213 |
| 6,377,805 B1 * | 4/2002 | Anvekar et al. | 455/436 |
| 6,651,105 B1 * | 11/2003 | Bhagwat et al. | 709/239 |
| 6,845,398 B1 * | 1/2005 | Galensky et al. | 709/231 |
| 7,103,906 B1 * | 9/2006 | Katz et al. | 725/87 |
| 7,451,205 B2 * | 11/2008 | Cheung et al. | 709/224 |
| 7,533,158 B2 * | 5/2009 | Grannan et al. | 709/219 |
| 2002/0116555 A1 | 8/2002 | Somers et al. | |
| 2005/0091395 A1 | 4/2005 | Harris et al. | |
| 2005/0128995 A1 | 6/2005 | Ott et al. | |
| 2005/0132049 A1 * | 6/2005 | Inoue et al. | 709/225 |

* cited by examiner

*Primary Examiner* — Hussein A Elchanti
(74) *Attorney, Agent, or Firm* — Michael J. Donohue; Davis Wright Tremaine LLP

(57) ABSTRACT

An adaptive file delivery system and method transmits a data file, such as an audio-video file, over a network or collection of networks in segments, each segment transmitted during a different time period. Each time period has a transmission portion to transmit its associated file segment and a wait portion in which no further interaction with the network occurs regarding the transmitted segment. In some implementations, the duration of the transmission portion of each time period is sufficient to reach a steady-state throughput condition, which allows the traffic load status of the network or networks to be determined from rate measurements of file segment transmissions. The duration of the wait portion of each time period is at least long enough to limit the average rate of file segment transmission to adapt to network traffic load variations while causing the entire file to be delivered in a predetermined delivery deadline.

21 Claims, 22 Drawing Sheets

US 7,921,196 B2

ADAPTIVE FILE DELIVERY WITH TRANSPARENCY CAPABILITY SYSTEM AND METHOD

CROSS REFERENCE TO RELATED APPLICATIONS

This invention is a continuation-in-part of U.S. patent application Ser. No. 11/278,809, filed Apr. 5, 2006 which claims the benefit of Provisional Application No. 60/668,864 filed on Apr. 7, 2005.

FIELD OF THE INVENTION

The present invention is generally related to computer networks, and more particularly related file transmission over such networks.

DESCRIPTION OF THE RELATED ART

Networks such as the Internet and wide area networks (WANs) have significant amounts of installed equipment to furnish such services as file transfer services. Based upon capacity of the installed equipment certain sized files can be transmitted efficiently over these networks using conventional transmission methods without sizable impact upon the networks.

Other desired scenarios involving file transfer services have been largely avoided by conventional file transfer methods due to massive sizes of files to be transmitted and/or distribution demands, such as with large scale multicasting of significantly sized files. Examples of such massive file sizes can include large format high-resolution audio-video or electronic game files. Transmissions of massive sized files using conventional methods for networks such as the Internet or WANs including but not limited to wired (Digital Subscriber Line (DSL), cable, powerline), fiber, wireless, satellite, and cellular types, given their current equipment base, could cause significant impact upon these networks, especially if done on a frequent basis, so do not appear to be practical or possibly even feasible. Conventional solutions have focused upon expanding network transmission capacities to meet peak traffic demands. Unfortunately, these conventional solutions require huge expenditure of resources and funds so for the most part remain as questionable options.

BRIEF DESCRIPTION OF THE SEVERAL VIEWS OF THE DRAWING(S)

DETAILED DESCRIPTION OF THE INVENTION

Figure 1:
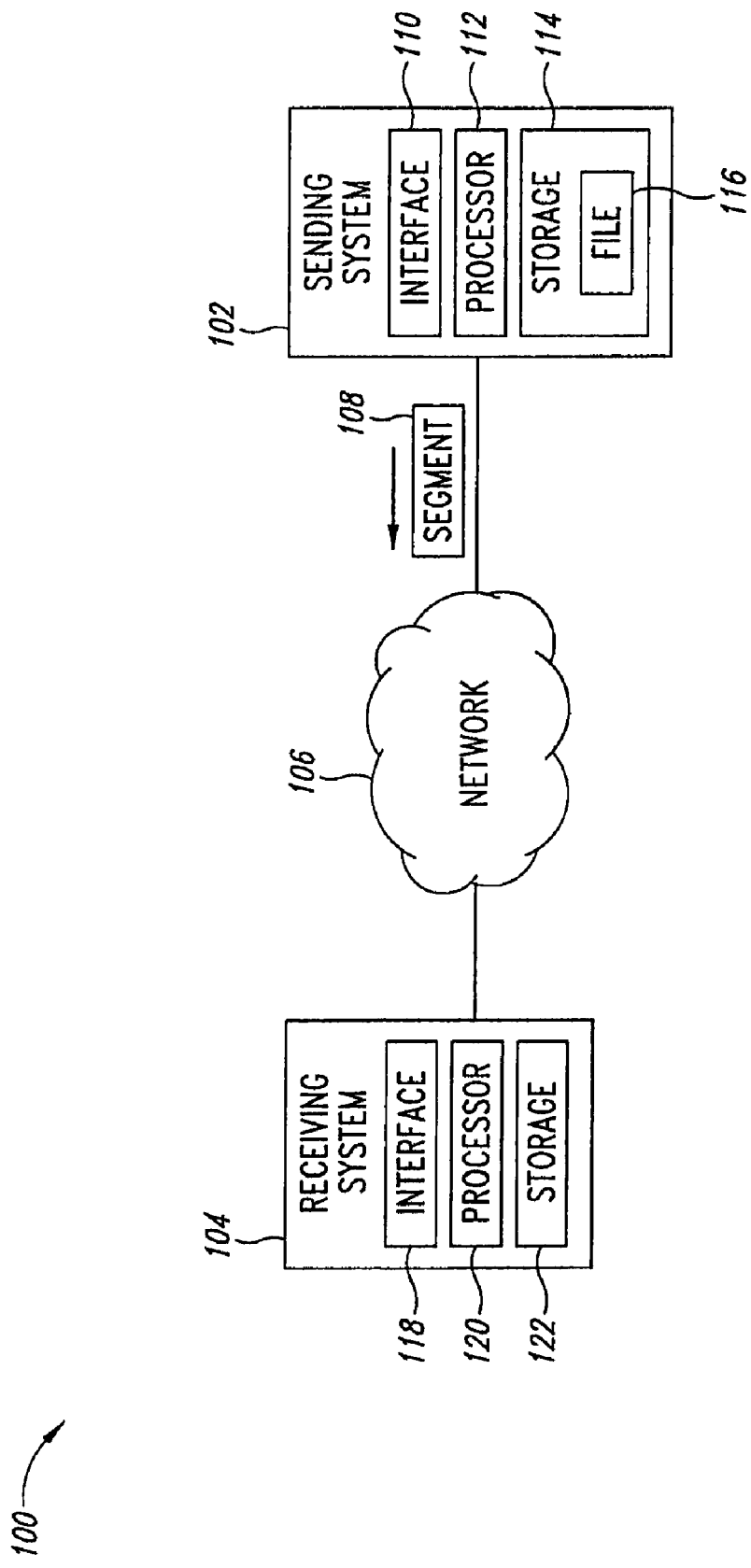
FIG. 1 is a schematic generally representing an exemplary implementation of an adaptive file delivery system.

As discussed herein, an adaptive file delivery system and method transmits a data file, such as an audio-video file, over a network or collection of networks in segments wherein each segment is transmitted during a different time period. Each time period has a transmission portion to transmit its associated file segment and a wait portion in which no further interaction with the network occurs regarding the transmitted segment. In some implementations, the duration of the transmission portion of each time period is sufficient to reach a steady-state throughput condition, which allows the traffic load status of the network or networks to be determined from rate measurements of file segment transmissions. The duration of the wait portion of each time period is at least long enough to provide an effective rate of file segment transmission that accommodates network traffic load variations while causing the entire file to be delivered in a predetermined delivery deadline.

In general, networks having large user populations experience regular peak congestion periods with somewhat daily, weekly, and yearly periodicity. Designing networks to weather these peak periods is the domain of traffic engineering. Network designers must focus on peak congestion in order to build out the network resources to handle the load adequately during these exceptional periods of operation. Unfortunately, this necessarily means there are large gaps in time when the networks are underutilized.

Furthermore, with data applications, there is a tradeoff between how much available bandwidth is required between source and destination, and how long it takes to deliver the information. For many applications there is the expectation of real-time or near-real-time latency between the request and delivery of the information. For instance, when a personal computer (PC) user enters a web address, there is the expectation that the page will be retrieved in a few seconds or less. Similarly, for a large email transfer, once the request is made, the network is expected to complete the operation at the peak rate the network is able to deliver. However, for non-real-time applications where the delivery deadline is hours or days away, the data transfer rate can be drastically reduced.

The adaptive file delivery system and method provides selective scheduling of the delivery of massive files, such as large format high resolution audio-video and other media files, during periods of minimum network activity. By extending delivery times, efficient transport of large amounts of information can be accomplished with little or no impact on the existing networks connecting the sender and receiver. The adaptive file delivery system supports massive file transfer while smoothing network peaks created when large number of users is actively online at once. The adaptive file delivery system and method can also be scalable depending upon delivery requirements.

The adaptive file delivery system contributes in reducing network impacts of transferring massive files, in responding quickly to congestion caused by other network traffic, in adjusting transfer rates to maintain delivery deadlines, and in scaling to large numbers of receiving systems and sending systems without impacting worst-case network model scenarios.

An adaptive file delivery system 100 is shown in FIG. 1 to include a sending system 102 and a receiving system 104 both communicatively linked to a network 106. The sending system 102 could be comprised of a computer system or a plurality of collocated or distributed computer systems such as a servers, databases, storage units, routers, switches, firewalls, or other such devices, connected via fiber, wireline, wireless means to the network 106. The receiving system 104 could be collocated with a DVR, PC, network storage unit, client work station, television set top box, modem, gateway, or other such devices such as a personal data assistant (PDA), portable audio-video player, cellular communication device such as a cell phone or in a dedicated hardware unit. The receiving system 104 could be connected via fiber, wireline, wireless means to the network 106. The network 106 could include one or more network components from the Internet or other networks, such as WANs, including but not limited to wired (DSL, cable, powerline), fiber, wireless, satellite, and cellular type networks. The network 106 could include other such network components such as but not limited to modems, routers, bridges, gateways, network interfaces, cabled transmissions, wireless transmissions, local area networks (LANs), access networks, provider networks, and peer-to-peer arrangements. The sending system 102 is shown in FIG. 1 as sending a file segment 108 over the network 106 to the receiving system 104. The sending system 102 includes an interface 110 to access the network 106, a processor 112, and storage 114 containing a file 116 to be transmitted over the network to the receiving system 104 and containing one or more modules with instruction to implement adaptive file delivery methods. The receiving system 104 includes an interface 118 to access the network 106, a processor 120, and storage 122 to store copies of portions of the file 116 received from the sending system 102 and to store one or more modules to implement instructions regarding adaptive file delivery methods. It is understood that the receiving system 104 could be located at an end user's location or be located at some intermediary network location e.g. to serve as a caching mode for distributing content geographically closer to a plurality of end users.

The file segment 108 is a copy of a portion of the file 116. The sending system 102 sends a copy of the file 116 to the receiving system 104 by breaking up the file copy into a plurality of segments such as including the segment 108 shown in FIG. 1. The plurality of segments is sent over the network 106 one at a time until the receiving system 104 has received an entire copy of the file 116. Each segment is sent at a different one of a plurality of time periods.

The time periods each have a transmission portion in which one of the file segments is transmitted and a wait portion in which none of the file segments are transmitted. The wait portions can effectively space out the transmission portions so that the file segments are transmitted over a period of time that is significantly larger than if the segments were transmitted as a continuous stream of segments. The transmission portions of the time periods are spaced out to significantly lessen detrimental impact upon traffic load of the network 106 involved with transmission of massive files. Based upon approaches further described below, larger sized file segments and/or a larger number of the file segments are transmitted when traffic load on the network 106 is relatively light than when traffic load on the network is relatively heavy. By at least partially utilizing periods of light network traffic, massive files can be transmitted with reduced detrimental impact upon traffic load of the network 106.

In some implementations, a user of the receiving system 104 uses a graphical user interface to request of the sending system 102 a file with an associated delivery deadline and priority among a plurality of similar file requests for separate content files. Through the request, the sending system 102 and receiving system 104 are informed that the receiving system has authorization to receive the requested file and are informed of the transfer configuration details. An overview of some of the events occurring with adaptive file delivery are included in the following, not necessarily in the following order: (1) the receiving system 104 requests a file, (2) the sending system 102 locates and obtains authorization for delivery of the requested file and in some implementations obtains a digital rights management (DRM) license, (3) the adaptive file delivery module or modules of the sending system obtains transfer details such as delivery deadline, client profile including client LAN idle-schedule, provider network 106 idle-schedule, file size, and so forth, (4) the adaptive file delivery module or modules of the receiving system obtains transfer details such as identity of the sending system, file size, and so forth, (5) sending system calculates the minimum transfer rate needed to meet the requested delivery deadline and the maximum rate allowable for transfer of segments of the file. Some implementations are based on standard client/server TCP/IP or UDP/IP interactions between the sending system 102 as server and the receiving system 104 as client.

Figure 2:
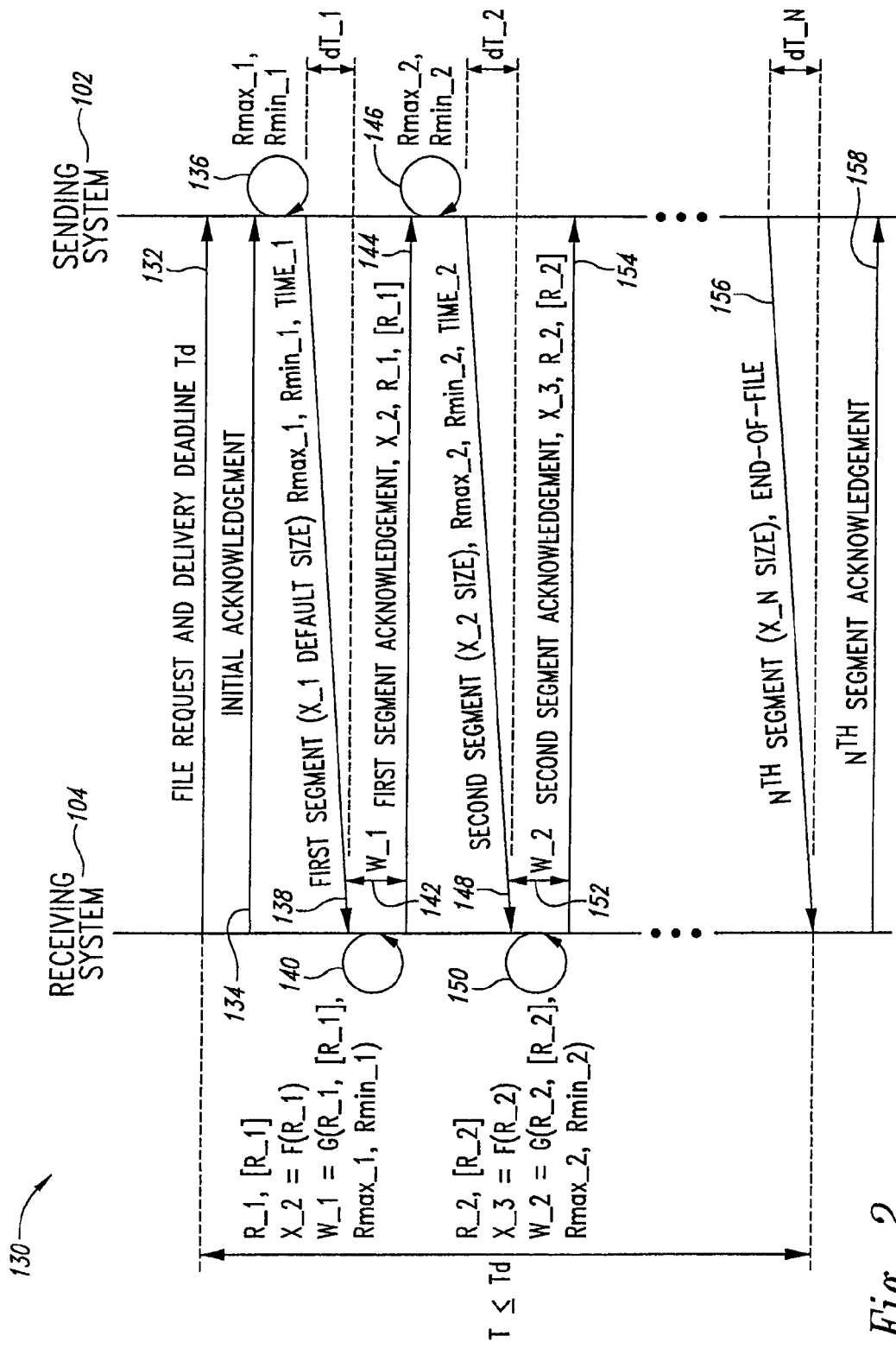
FIG. 2 is an interaction diagram depicting an exemplary implementation of methods used by the adaptive file delivery system of FIG. 1.

An exemplary adaptive file delivery method 130 is shown in FIG. 2 to include the receiving system 104 sending a file request and a delivery deadline, Td, to the sending system 102 (step 132). Although passage of time as depicted in FIG. 2 follows a downward vertical direction, the passage of time is not shown to scale in FIG. 2. Generally, only the time periods, W_j, associated with the wait portions of the transmission periods, and the time periods associated with the time periods, dT_j, associated with the segment transmission portions of the transmission periods require relatively significant amounts of time to pass. Although it may appear on FIG. 2 that other activities depicted take a relatively significant amount of time, as well, these other activities in general take relatively insignificant amounts of time and are allotted additional space along the vertical axis of FIG. 2 only for convenience in displaying the activities due to the limitations of the form of depiction rather than an intent to display these other activities as taking relatively significant periods of time.

The delivery deadline, Td, is generally a time by when a user of the receiving system 104 would desire the receiving system to have received all segments of the file 116. In some implementations, the delivery deadline, Td, may be calculated by the system 100 to be of a certain duration (e.g., a plurality of hours or days from a time the file is first requested or begun to be transmitted or from another time) and as a consequence, may effectively reduce the overall transfer rate of the file to a level even below an overall rated or experienced minimum capacity of the network 106, such as even below a capacity of the network experienced during certain congested periods or experienced during other periods of network activity. The receiving system 104 then sends to the sending system 102 an initial acknowledgment, which serves as a request for the first file segment to be sent by the sending system (step 134). Upon receiving the initial acknowledgment from the receiving system 104, the sending system 102 determines a first maximum segment transmission rate limit, $Rmax\_1$, and a first minimum segment transmission rate limit, $Rmin\_1$ (step 136).

In general, the minimum segment transmission rate limit, Rmin, is determined by the sending system 102 based upon two factors. The first factor is file size, Xrem, of that remaining portion of the file 116 that has yet to be sent by the sending system 102 to the receiving system 104. The second factor is the amount of remaining time available to transmit file segments from the sending system 102 to the receiving system 104 between the present time of the determination, Tnow, and the time of the delivery deadline, Td. The amount of remaining time available may be reduced by predetermined amounts of time, Tunavail, known when adaptive file delivery cannot occur above a configurable lower transfer rate threshold (that could be zero or higher) for the particular file transmission due to unavailability of the network 106 and/or the sending system 102 and/or the receiving system 102 for segment transmission.

These unavailable time periods, Tunaval, may be typically busy periods for the network 106 and/or the sending system 102. The unavailable time periods, Tunaval, can be pre-configured into the profiles of the sending system 102 and/or the receiving system 104. Alternatively, the unavailable time periods, Tunaval, can be determined by the sending system 102 and/or the receiving system 104 by examining historical data of previous transmissions including adaptive file delivery transmissions. For instance, historical data regarding the actual segment transmission rates, $R\_j$, for one or more of the jth segment transmissions of an adaptive file delivery could be examined to determine busy times for the sending system 102, and/or the receiving system 104, and/or the network 106.

For example, a user of the receiving system 104 may want to block adaptive file delivery for a particular time period during each weekday from 9:00 a.m. to 11:00 a.m. if the user's requirements for tasks for the receiving system other than adaptive file delivery necessitates maximum performance from a portion of the network 106 local to the receiving system during those times. For the blocked period, the user of the receiving system 104 could configure the profile of the receiving system to indicate whether a transfer was permitted to proceed during this blocked period at some minimal background rate, such as a rate below $Rmin\_j$. Alternatively, the user may configure the profile of the receiving system 104 to not receive any adaptive file delivery during this blocked period. If a user of the receiving system 104 does not specify a time period when the user does not want the receiving system to receive file segments, then the receiving system can learn these block out periods by monitoring use of the receiving system and one or more portions of the network 106 local to the receiving system for such things as busy periods, variation in segment transmission rates, etc. Similarly, an access network provider might want to block adaptive file delivery for particular busy hour periods during each day if the providers' network was otherwise busy or near capacity with unrelated traffic. The provider might also want to limit the plurality of adaptive file delivery jobs across their network to an aggregate minimal background rate.

A prudent measure would insure that the sending system 102 would conservatively determine the value for each minimum transfer rate, $Rmin\_j$, to be larger than may be necessary to meet the requested delivery deadline, Td, if actual practice fortunately has more favorable conditions than may be conservatively anticipated. It is understood by this conservative approach that calculations of $Rmin\_j$, typically presuppose a "just in time" completion of adaptive file delivery based on the remaining file size and any anticipated idle periods.

Since the network 106 may have a surplus capacity not factored into the conservative $Rmin\_j$, determinations, the adaptive file delivery may proceed faster than an estimate based upon segment transmissions performed exclusively at an average rate of all the $Rmin\_j$, involved in the adaptive file delivery. Consequently, a number of actual transfers of various massive files may finish early. Using a conservative approach of estimating $Rmin\_j$, provides a buffer of time against unanticipated network congestion and maintains the expectation of completing the adaptive file delivery by the requested delivery deadline, Td. If, due to unexpected congestion, a transfer falls behind its minimum rate schedule, the adaptive file delivery methods automatically compensates by gradually raising the minimum transfer rate, $Rmin\_j$, after each successive jth segment transmission as the delivery deadline approaches. This gradual raising of successive minimum transfer rates, $Rmin\_j$, is a graceful way of adjusting priorities to favor late jobs over on-time or ahead-of-schedule jobs. $Rmin\_j$, is evaluated by the sending system 102, or in alternative implementations by the receiving system 104, each time a file segment is sent from sending system to the receiving system.

An exemplary equation for determination of Rmin for the jth transmission is as follows:

$$Rmin\_j = Xrem\_j / (Td - Tnow\_j - Tunaval\_j). \quad (1)$$

In some implementations, the sending system 102 can send updates to an estimated delivery time, which may be the same as, sooner than, or later than the requested delivery deadline, Td, depending whether any delaying events occur on the network 106. A practical result of keeping the receiving system 104 updated as to an estimated delivery time would be to reduce the number of inquiries by a user of the receiving system regarding this estimated delivery time.

In general, the maximum segment transmission rate limit, Rmax, is greater than the minimum segment transmission rate limit, Rmin, by an amount depending on one or more of a number of possible factors including any additional surplus transmission capacity of the sending system 102 that has not been allocated to another transmission task. Other possible factors that could be used to influence Rmax include the maximum permitted transfer rate to a user determined by their service agreement with their network provider, the actual measured rate of last segment or averaged rate of the last N segments, pre-configured access network provider profiles, etc. Thus, the maximum segment transmission rate limit, Rmax, is determined by the sending system 102 based upon three factors.

The first factor is the minimum segment transmission rate limit, Rmin, already determined. The second factor is the maximum transmission rate capacity, Rcap, of the sending system 102. Maximum transmission capacity of the sending system 102 is affected by such things as transmission bandwidth capacity of the interface 110 of the sending system.

The third factor takes into consideration not only the present task for the sending system 102 to transmit the file 116 to the receiving system 104, but also takes into consideration any other active jobs for other file transmission tasks undertaken by the sending system to transmit at least a portion of another file to the receiving system 104 or any other receiving systems during the time span in which the file 116 is to be sent. The number of these other tasks can be expressed as "Q−1" so that the number Q includes all active transmission jobs including the file 116 transmission task.

One approach assumes that any surplus transmission capacity of the sending system 102 would be allocated equally among the Q transmission tasks. By this approach, transmission surplus allocated to the file 116 transmission task would be the difference between Rcap/Q and the average of the minimum segment transmission rate limits of the Q transmission tasks, <Rmin>. The average <Rmin> can be expressed as Sum(Rmin)/Q where Sum(Rmin) represents the sum of all the various minimum segment transmission rate limits for the Q transmission tasks.

An exemplary equation for determination of maximum segment transmission rate limit, Rmax, for the jth segment transmission of file 116 transmission task is as follows:

$$Rmax\_j = Rmin\_j + Rcap/Q\_j - Sum(Rmin)\_j/Q\_j,$$

It is understood that Rmax_j, as calculated in Equation 2 would be limited to values equal to or exceeding Rmin_j.

Equation 2 is an example of a policy that the sending system 102 might enforce but other policy decisions could equally be employed to calculate Rmax. For instance, an alternative approach would not equally share surplus bandwidth but would rather give priority to selected transmission jobs. For instance, in order to give surplus transmission capacity temporarily to particular jobs, the sending system 102 could use congestion measurements to reduce Rmax for jobs that were unable to take advantage of the maximum allocated rate.

In addition to Equation 2, it is further understood that Rmax_j, could be subject to a number of additional constraints intended to further react to congestion sensed in the network 106. An additional exemplary Equation (2a) for determination of the maximum segment transfer rate limit, Rmax, for jth segment of file 116 transfer task is as follows:

$$Rmax\_j = H(R\_(j-1)) * Rmax\_j, \quad (2a)$$

where Rmax_j, on the right side of Equation 2a is as calculated in Equation 2 above and where R_(j−1) is the actual measured rate of the previously sent segment or zero if it is the first segment. For example $$H(R\_(j-1)) = (R\_(-1)/Rpeak)^{**n}, n=2,3 \quad (2b)$$

where Rpeak is the maximum allowed throughout to a given receiving system 104, e.g. enforced by the receiving system's network 106. Other functional dependencies on the measured rate R as in equation 2b and other congestion sensing metrics are possible including configured time-of-day profiles from operators of the network 106, feedback of congestion sensing agents in the network 106, and so on.

After determining the first maximum segment transmission rate limit, Rmax_1, and the first minimum segment transmission rate limit, Rmin_1 in step 136, the sending system 102 transmits a first transmission (step 138) including a first segment of the file 116, values for Rmax_1 and Rmin_1 and a time stamp indicating the time that the first transmission was sent from the sending system. The first transmission is the transmission portion of a first time period, which also includes a wait portion as discussed further below.

The file size of the first segment, X_1, is a predetermined default value. In general, a file segment is made up of a number of smaller file sub-segment portions. In some implementations, a file to be transmitted to the receiving system 102 from the sending system 102, is stored in storage 114 of the sending system formatted into segments of sequentially numbered sub-segment portions of fixed size. Although in these implementations the size of the sub-segment portions do not change, individual segments made up of sub-segment portions can have different sizes by containing different number of sub-segment portions. The sub-segment portions can be sized to be the smallest portion of a file that can be sent by a network having a predetermined transmission capacity typically having a smallest practical value.

Upon receipt of the first transmission from the sending system 102, the receiving system 104 performs a number of determinations (step 140) regarding (1) the actual transmission rate, R_1, of the first transmission, (2) the effective transmission rate [R_1] of the first transmission, and (3) the time duration, W_1, of the first wait portion of the total time period associated with the first transmission.

In determining the actual transmission rate of the first transmission, the receiving system 104 determines the time difference, dT_1, between completion time of the first transmission as measured by the receiving system and start time of the first transmission as indicated by the time stamp found in the first transmission received by the receiving system. This time difference, dT_1, is used by the receiving system 104 as the transmission time for the first transmission.

The receiving system 104 either measures or reads from data included with the first transmission the segment size, X_1, of the first segment sent in the first transmission. The receiving system 104 is then able to calculate an actual transmission rate, R_1, of the first transmission by the following general equation for the jth transmission:

$$R\_j = X\_j/dT\_j,$$

The receiving system 104 then determines an effective transmission rate, [R_1], of the first transmission to accommodate present conditions regarding the sending system 102 and the network 106 known to the sending system. In general, the effective transmission is the file size of a segment divided by the total duration of the time period associated with the segment. This time period as discussed above includes a segment transmission portion and a wait portion. If the wait portion had a duration of zero, then the effective transmission rate would be equal to the actual transmission rate, which, if it exceeded Rmax, would most likely cause detrimental network impact for transmission of massive files or multicast transmission of significantly sized files. By selecting an effective transmission rate that is significantly smaller than the actual transmission rate and consistent with Rmax, the sending system 104 can lessen or virtually eliminate detrimental impact to the network 106 of transmission of massive files or multicast transmission of significantly sized files.

In some implementations, the network 106 could be made up of portions such as including the Internet, a regional network, and a local network serving the receiving system 104.

Given the determined value of the actual transmission rate, R_1, of the first transmission and possibly given status input from other devices such as network probes or status information of the sending system 102 contained in the first transmission, the receiving system 104 selects an effective transmission rate, [R_1], for the first transmission that is appropriate to whatever status information is known to the receiving system.

By using the determined actual transmission rate, R_1, of the first transmission and possible other input, the receiving system 104 is able to react to congestion between the sending system 102 and the receiving system wherever the congestion may be located. For instance, if a portion of the network 106 local to the receiving system 104 is busy with unrelated traffic or has status unknown to the receiving system, the receiving system can select an effective transmission rate, [R_1] for the first transmission equal to the first minimum segment transmission rate limit, Rmin_1. Selection of the first minimum segment transmission rate limit will cause the least amount of impact upon the network 106 while still meeting the delivery deadline, Td.

On the other hand, if the network 106 is known by the receiving system 104 to be practically idle, the receiving system can select an effective transmission rate, [R_1], for the first transmission equal to the first maximum segment transmission rate limit, Rmax_1, which would still not detrimentally impact the network given that little if any other network traffic is present. Typically, network conditions and those of the sending system 102 may be in an intermediate condition so that if this condition is known to the receiving system 104, the receiving system would select an effective transmission rate, [R_1], for the first transmission between the first minimum segment transmission rate limit, Rmin_1, and the first maximum segment transmission rate limit, Rmax_1.

The receiving system 104 can also halt an adaptive file delivery altogether or proceed at an effective transmission rate, [R_j] for the jth transmission at a rate even below the value of minimum segment transmission rate, Rmin_j, for the jth transmission to accommodate other adaptive file deliveries or other activities on the network 106 and/or on the sending system 102 and/or the receiving system 104. For example, in some versions the receiving system could be notified by software congestion sensing agents attached to a local area network shared by the receiving system, that the local area network was becoming congested with unrelated network traffic, whereupon the receiving system could halt or reduce the effective transmission rate of the adaptive file delivery. In cases where the receiving system 104 has adjusted the effective transmission rate, [R_j,] for the jth transmission below the minimum segment transmission rate, Rmin_j, for the jth transmission, the sending system 102 recalculates an incrementally larger minimum segment transmission rate, Rmin_j,+1 for the j+1th segment transmission based on the remaining file size and delivery deadline. Consequently, pacing of the segment transmissions tends to accommodate unexpected network congestion or interruptions in transmission. In other implementations, selection of the effective transmission rate for the jth transmission, [R_j,] can be required to always stay between the minimum segment transmission rate limit and the maximum segment transmission rate limit for the particular transmission involved.

The receiving system 104 paces transmissions of the segments by selection of the effective transmission rates to transfer a copy of the file 116 from the sending system 102 at an adaptive rate to accommodate changing conditions with the sending system 102 and/or the receiving system 104 and/or the network 106. By using the value for the actual transmission rate, R_1, of the first transmission and possible other input, the receiving system 104 is able to make an intelligent choice for the effective transmission rate. Through these adaptive file transfer methods, the segment transmissions are used as an actual sounding system for the end-to-end downlink connection capacity from the sending system 102 to the receiving system 104. The adaptive file delivery system 100 can then react to congestion between the sending system 102 and the receiving system 104 regardless of location of the congestion.

Based upon a selection by the receiving system 104 for the effective transmission rate, [R_1], for the first transmission, the time duration, W_1, of the first wait portion of the total time period associated with the first transmission can be derived by the following general equation for the jth transmission:

$$W\_j = X\_j / [R\_j] - X\_j / R\_j,$$

As part of step 140, the receiving system 104 also calculates the size of the next segment to be sent by the sending system 102, namely, the second segment having a second segment size, X_2. To do so, the receiving system 104 uses a predetermined general value, Tss for the amount of time required for the network 106 to reach a steady-state condition in transmitting a segment. For instance, in a TCP environment, Tss could be equal to approximately 5 seconds. The actual transmission rate, R_1, for the first transmission is multiplied by Tss to get X_2 by the following general equation:

$$X\_j+1 = R\_j * Tss.$$

It is also illustrated that variability in the actual transmission rates from one file sequent transfer to the next might cause undesirable oscillation in the calculation of X_(j+1). One practical method for avoiding this is to use a sliding window average of the last N samples of the actual transfer rate R.

After waiting (step 142) the time duration, W_1, of the first wait portion of the total time period associated with the first transmission, the receiving system 104 transmits (step 144) a first segment acknowledgment including the second segment size, X_2, to the sending system 102.

The sending system 102 then determines (step 146) a second minimum segment transmission rate limit, Rmin_2, using equation (1) and a second maximum segment transmission rate limit, Rmax_2 using equation (2). The sending system 102 transmits a second segment of the file 116 having the second segment size, X_2 in a second transmission (step 148). The sending system 102 also transmits values for Rmax_2 and Rmin_2 and transmits a timestamp indicating the time that the second transmission was sent from the sending system 102.

Upon receiving the second segment, the receiving system 104 calculates (step 150) the time required for the second segment transmission, dT_2, and using the value for the second segment size, X_2, determines the actual transmission rate, R_2, of the second segment from equation (3). Also in step 150 the receiving system 104 selects an effective transmission rate for the second segment [R_2] based upon known network traffic conditions as discussed above and then determines a second wait portion, W_2, for the total time period associated with the second transmission according to equation (4). The receiving system 104 then determines a third segment size, X_3, according to equation (5).

After waiting (step 152) the second wait portion, W_2, of the total time period associated with the second transmission, the receiving system 104 sends a second segment acknowledgment (step 154) including the value for the third segment size, X_3.

Subsequently, the sending system 102 sends remaining segments of the file 116 to the receiving system 104 according to the procedure discussed above until the final nth segment of the file 116 is sent in an nth segment transmission (step 156) to the receiving system optionally including an end of file indication.

The adaptive file delivery proceeds in this fashion, paced by the receiving system 104, until the adaptive file delivery is complete. In the unfortunate event that the adaptive file delivery stalls or is disrupted by a network outage, the receiving system 104 retains the state of the transfer in the storage 122, such as non-volatile memory, for resuming the adaptive file delivery at the point of interruption to minimize or prevent wasted bandwidth. The receiving system 104 detects a stalled session, for example, by maintaining a count-down timer, such as found in a module stored in the storage 122 and implemented by the processor 120.

The count-down timer can start when the receiving system 104 makes the initial request to the sending system 102. The sending system 102 can then repeat for requests up to a given number of repetitions for adaptive file delivery each time the count-down timer expires after being reset. At each reset of the count-down timer the count-down time until expiration can be increased by a large factor, such as by an exponential factor, so that additional requests by the receiving system 104 can be spaced out accordingly. At the end of the final request by the receiving system 104 for adaptive file delivery, the receiving system can then declare the particular adaptive file delivery session to be stalled and can then attempt to connect to a second one of the sending systems 102, if available, for continuation of the adaptive file delivery. If the receiving system 104 fails to make contact with a second one of the sending systems 102, the receiving system can continue to make periodic attempts to contact one of a number of the sending systems listed as available until the delivery deadline, Td, has passed, after which the particular adaptive file delivery job is terminated by the receiving system and any portions of the file 116 that are stored in the receiving system are erased and an error is logged for notification to the receiving system user(s).

As described above, the sending system 102 and the receiving system 104 can be coupled to different portions of the network 106 that are each of a different type, such as being of wired, fiber, or wireless, and communicate therebetween. Furthermore, as also described herein, a file segment delivery sessions between the sending system 102 and the receiving system 104 can be interrupted (for whatever reason such as by a network outage) and later resumed, with transfer of the file segment proceeding at the point of interruption without need of resending previously sent and received portions. Implementations of the adaptive file delivery system 100 can utilize both of these two capabilities to allow file segment delivery sessions to complete when the sending system 102 or the receiving system 104 is disconnected from a first portion of the network 106, and reattached later to a second portion of the network regardless of whether the first portion of the network and the second portion of the network are of the same type (e.g. wired, fiber, wireless, etc.). Completion of an interrupted file segment delivery session can be initiated by either the receiving system 104 or the sending system 102 automatically without need of user intervention.

For example, the receiving system 104 can be connected to a first portion of the network 106 wherein the first portion is of a first network type. The sending system 102 can also be connected to the first portion of the network 106 or the sending system can be connected to a second portion of the network that is of a different network type than the first portion of the network. If after beginning a file segment delivery session, the receiving system 104 is disconnected from the first portion of the network 106, the sending system 102 can detect the disconnection of the receiving system via one of several monitoring processes that can be used by the sending system to detect connectivity status. For instance, a periodic query could be performed by the sending system 102 (e.g. once a second) regarding the local network interface status of the receiving system 104.

Alternatively or in addition, the receiving system 104 can detect the stalled session due to the disconnection of the receiving system from the first portion of the network 106 such as through use of the count-down timer found in the receiving system. Upon detection by the receiving system 104 of the disconnection, the receiving system can then request the remaining portion of a file segment if disconnection occurred during receipt of the file segment or to request the next file segment to be sent by the sending system 102 if disconnection occurred during a silent period between two sequential file segment transmissions. The request can commence once connection is subsequently established of the receiving system 104 to the first portion of the network 106 or a second portion of the network of the same of different network type than the first portion of the network 106. The receiving system 104 can detect that a reconnection to the network 106 has occurred through monitoring connectivity status by periodically querying the local network interface status.

Alternatively, the request can begin more immediately and be repeated in some manner until connection to one of the portions of the network 106 is subsequently established through use of the count-down timer found in the receiving system 104. The countdown-timer can pace a retry function to restart the stalled session so that the receiving system 104 will continue to receive additional file content at the point of the interruption. On occasion, an instance of the sending system 102 other than that used prior to session interruption can be used to resume the file segment transfer.

The request by the receiving system 104 for the next portion of the file segment or the next file segment does not matter to the sending system 102 as far as why the request is being sent from the receiving system 104. Regardless of whether the request is due to a network outage, network congestion, an intentional movement of the receiving system 104 to another portion of the network 106, or for another reason, the sending system 102 still operates to satisfy the request. Furthermore, the request by the receiving system 104 can arrive at the sending system 102 with a different source network address corresponding to a new network location for the receiving system 104. In some implementations the sending system 102 can use the network source address of the new network location of the receiving system 104 to learn where to send the subsequent file content, and infer other details about the connection such as its maximum throughput capacity based on performance records of previous sessions. In another implementation, upon detecting an offline to online status change, the receiving system 104 can send the sending system 102 status messages indicating the new connection details including session ID, new network address, maximum throughput capacity, and so on.

In some exceptional circumstances, the receiving system 104 or portions of the network 106 connecting the sending system 102 and the receiving system can be unavailable for a period of time extending past the delivery deadline. In some implementations this can trigger the receiving system 104 to abandon the transfer attempt, reset the session, and discard the partial content previously received. In other implementations, the receiving system 104 or the sending system 102 can detect the delivery exception and generate a system alert that could trigger notification of the end user of the system for request to continue, or abandon the session, or automatically continue the session once notification was triggered.

A primary scenario for interrupting and resuming a file delivery session can correspond to the receiving system 104 changing its network attachment. However, other scenarios are possible such as the sending system 102 changing its network attachment, or portions of the network 106 changing status or connectivity topology. In any case, the methods for detecting an interrupted session and later resuming it remain the same as the receiving system changing its network attachment.

Since the nth segment is the final segment of the file 116, in some implementations, the receiving system 104 does not perform determinations regarding an actual nth segment transmission rate, R_n, an effective nth segment transmission rate, [R_n], etc. but rather sends an nth segment acknowledgment (step 158) to the sending system 102 without executing a wait portion, W_n, for the nth transmission.

Figure 3:
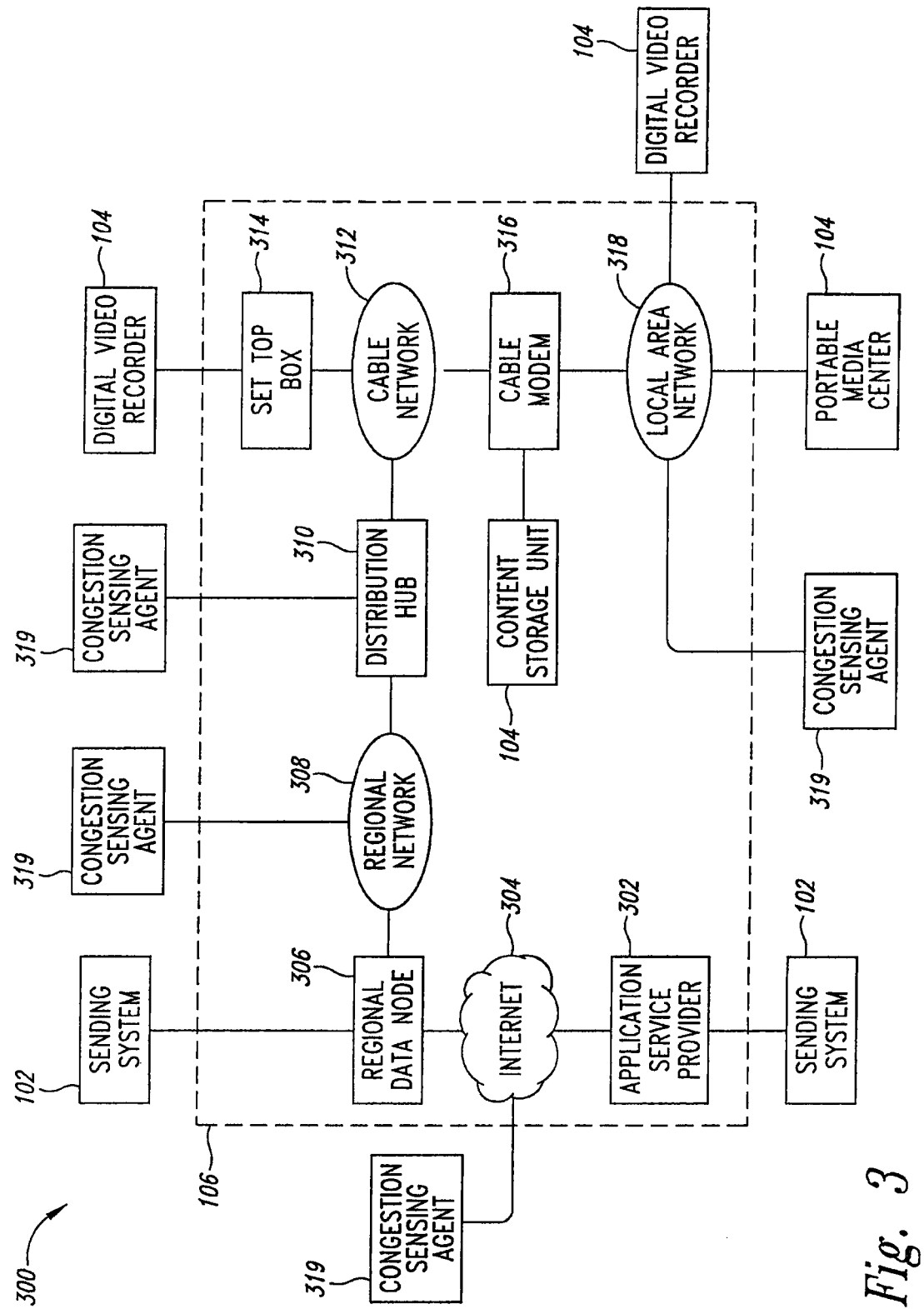
FIG. 3 is a schematic showing a first collection of exemplary implementations of the adaptive file delivery system.

A first collection 300 of exemplary implementations of the adaptive file delivery system 100 are shown in FIG. 3 as having one instance of the sending system 102 communicatively linked to an application service provider 302 that is communicatively linked to the Internet 304, which in turn is communicatively linked to a regional data node 306. Another instance of the sending system 102 is directly communicatively linked to the regional data node 306. The regional data node 306 is communicatively linked to a regional network 308, which is communicatively linked to a distribution hub 310, which is communicatively linked to a network 312 such as a hybrid fiber cable network.

An instance of the receiving system 104 as a digital video recorder is communicatively linked to the cable network 312 through a set-top box 314. Other instances of the receiving system 104 as a digital video recorder and as a portal media center are communicatively linked to the cable network 312 through a cable modem 316 and a local-area network 318. In some implementations, a congestion sensing agent 319 is communicatively linked to the local area network 318 to report to the sending system 102 or the receiving system 104 regarding network activity and network congestion on the local-area network for adjustment of when file segment transmissions occur. For example, a congestion sensing agent 319 or a plurality of similar agents communicatively linked to the local area network 318 could define a minimum throughput threshold for triggering a report of network activity not associated with an adaptive file transfer to the receiving device 104. Alternatively, the network activity report could contain a measure of the local area network 318 ingress and egress traffic activity, as seen by the congestion sensing agent 319 and reported to the receiving system 104, in order for the receiving system to determine the local area network congestion by comparing the reports with the configured or measured peak capacity of the local area network 318. It is further understood that in some versions, after exceeding a throughput threshold and triggering a report to the receiving system 104, the congestion sensing agent would not re-arm its reporting mechanism until it measured network activity below the trigger threshold by a delta to prevent an excessive of reports from being sent to the receiving system when the measured network activity was alternating just below and just above the trigger threshold.

In some versions, one or a plurality of congestion sensing agents 319 shown for example in FIG. 3 communicatively linked to the distribution hub 310 or the regional network 308 or the Internet 304 could provide measured reports of network activity or signal network congestion to the sending system 102. These congestion sensing agents would report to the sending system 102 in some versions or to the receiving system 104 in other versions to signal the network activity at specific points in the network 106.

Figure 4:
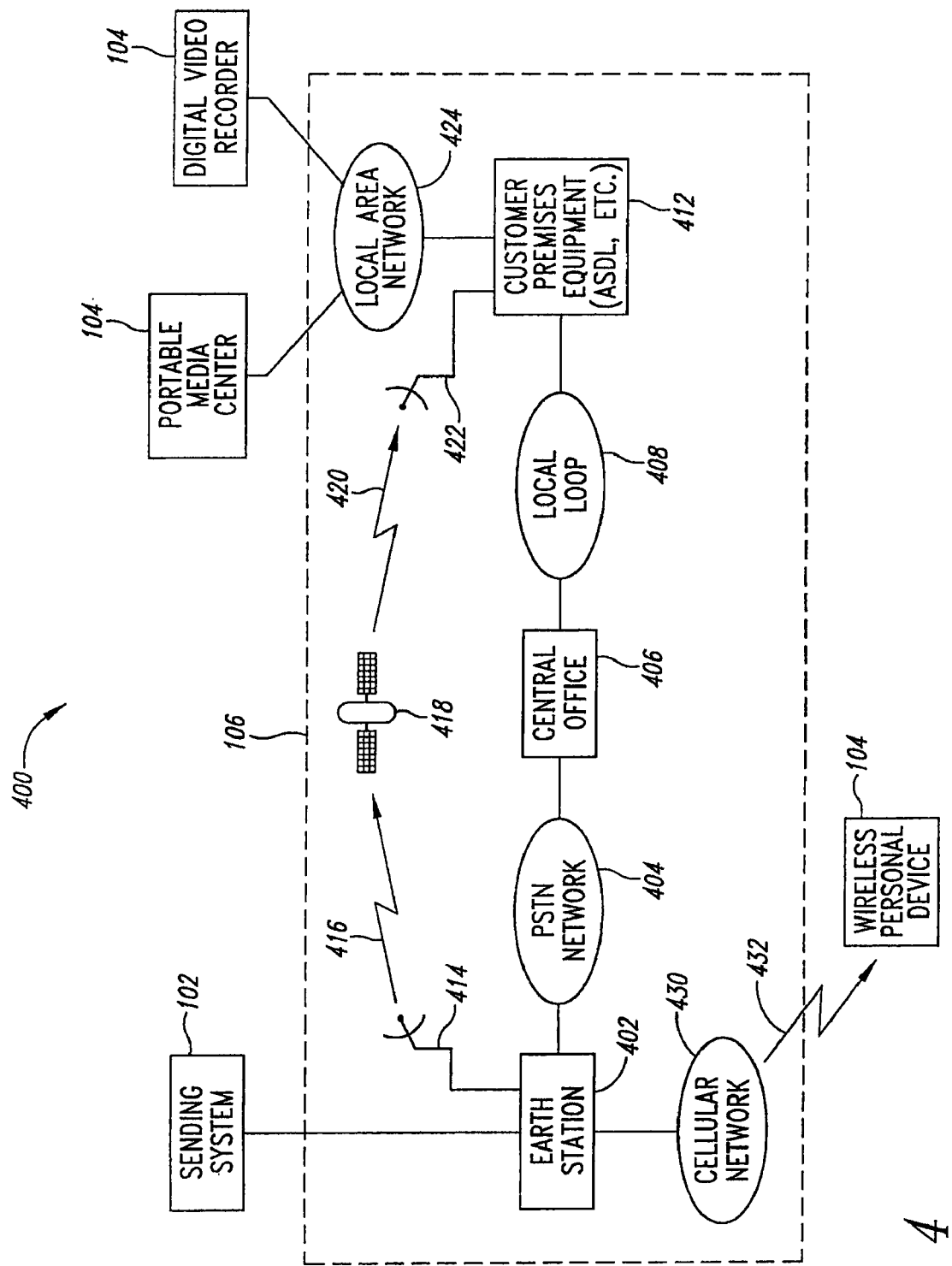
FIG. 4 is a schematic showing a second collection of exemplary implementations of the adaptive file delivery system.

A second collection 400 of exemplary implementations of the adaptive file delivery system 100 are shown in FIG. 4 as having one instance of the sending system 102 communicatively linked to an earth station 402 that is communicatively linked to a public switched telephone network (PSTN) 404 that is communicatively linked to a central office 406 that is communicatively linked to a local loop 408 that is communicatively linked, such as through a customer premises equipment, such as an asymmetric digital subscriber line (ADSL) device, 412.

The earth station 402 is also communicatively linked to a satellite sending system 414 that sends signals 416 to a satellite 418 that relays the signals 422 to a receiving station 422 that is communicatively linked to the customer premises equipment 412. Instances of the receiving system 104 as a digital video recorder and as a portable media center are communicatively linked to the customer premises equipment 412 through a local-area network 424. The earth station 402 is also communicatively linked to a cellular network 430 that sends wireless signals 432 to an instance of the receiving system 104 as a wireless personal device.

Although the receiving system 104 has been depicted in particular implementations, numerous other implementations can be used as well to receive massive files and output content of the massive files through audio output and/or video output and/or other output. Generally, approaches can implement a client/server model in which the receiving system 104 is the client and the sending system 102 is the server. However, other approaches using other models can be used.

Various implementations for the network 106 have been depicted, however, numerous other implementations can be used as well. For instance, the sending system 102 could alternatively be located in a local access network of the receiving system 104 without changing basic delivery architecture of the network 106 communicatively linking the sending system to the receiving system.

The adaptive delivery system and method is inherently highly scalable. The adaptive delivery system and method can be scaled to support large pluralities of simultaneous instances of the adaptive delivery method being executed on each one of one or more large pluralities of instances of the sending system 102. By executing large pluralities of simultaneous instances of the adaptive delivery method, each instance of the sending system 102 can send massive files to large pluralities of the receiving system 104. In general, arrays of instances of the sending system 102 can be located in separate regional facilities to support sending massive files through simultaneously executed instances of the adaptive file delivery method to large pluralities of instances of the receiving system 104. These arrays or other sorts of collections for the sending system 102 could be positioned in a central location on the network 106 or could be distributed across the network. Various components of the sending system 102 could be located in a same hardware device or could be distributed amongst various hardware devices. Also, various segments of a massive file could be distributed amongst multiple instances of the sending system 104 or multiple instances of the same massive file could be stored on multiple instances of the sending system 104 so that the overall file delivery system 100 including multiple instances of the sending system 104 can send segments of the massive file to the receiving system 102 using pathways of the network 106 according to fluctuating network traffic loads. For instance, various segments of a massive file can be sent from multiple instances of the sending system 104 to insure a reduced impact to any already congested portions of the network 106 through use of such assisting factors as updated or near real time monitoring and feedback on a segment transmission by segment transmission basis if desired. Balancing of the instances of the sending system 104 could be implemented to reduce overall bandwidth impact to the network 106 to efficiently use resources of the network. One approach to determine whether the sending system 104 is at maximum capacity is to verify whether the sending system can accommodate another file transfer job with the associated minimum transfer rate, Rmin.

Additional monitoring systems, such as involving the congestion sensing agent 319 described above or involving other congestion sensing agents or sounding agents, and methods may be used to refine determination by the receiving system 104 of the jth wait period w_j. For instance, one or more modules containing code to implement portions of the adaptive file delivery methods for the receiving system 104 could reside on a gateway device communicatively linking a portion of the network 106 local to receiving system 104 to another portion of the network closer to the sending system 102.

As an example, gateway devices hosting such monitoring systems may include a cable or DSL modem or LAN switch, router, or hub. A software agent on the gateway could monitor Internet or other local network usage. The software agent on the gateway could monitor any network traffic not associated with an adaptive file delivery transmission particular to one or more of the sending system 102 and the receiving system 104 combinations. Upon notification of local network traffic local to the receiving system 104 by the software agent, the receiving system 102 client could take appropriate action by slowing or stopping an ongoing segment transmission, as discussed above, until the portion of the local network is again reasonably accommodating to another segment transmission. Appropriate timers and lower usage limits could be in place to average usage over a period (e.g. 5 minutes and 10 kbps) so that insignificant background activity below a threshold can be ignored.

Alternatively, software agents could be installed on computer workstations on a portion of the network 106 local to the receiving system 104 that could discover and report via the local portion of the network to the receiving and/or the sending system 102 when activity on other portions of the network, such as an Internet portion, was detected by one of the workstations as being unacceptably busy for a segment transmission.

Alternatively, a device, such as a two-port Ethernet hardware/software module could be installed in-line with a gateway or broadband modem local to the receiving system 104. The device could monitor all traffic passing through it and report activity on one or more portions of the network 106, such as Internet activity, not associated with a segment transmission from the sending system 102 to the receiving system 104.

Each session of the adaptive file delivery method probes and can react to access network congestion for each file segment that is delivered by monitoring and reporting the actual transfer performance. In addition to this, a global view of capacity/congestion issues for the network 106 may optionally be augmented by software sounding agents strategically located across the access portions of the network and reporting back to the sending system 102. These sounding agents could report a local view of total aggregate bandwidth and remaining capacity. For example, in DSL networks these network activity measuring sounding agents could be located at DSL access multiplexers (DSLAMs), and for cable networks they could be located at each cable modem termination system (CMTS) and for 3G, cellular they could be located at the base stations or Access Service Node gateways. The sending system 102 could then have additional information to refine policy profiles for a particular access provider or other portion of the network 106 in order to constrain total volume of traffic sessions being delivered at any time across the network 106 or to a particular portion. For instance, this constraint could be implemented based on time-of-day or percentage of available surplus capacity of the network 106.

Figure 5:
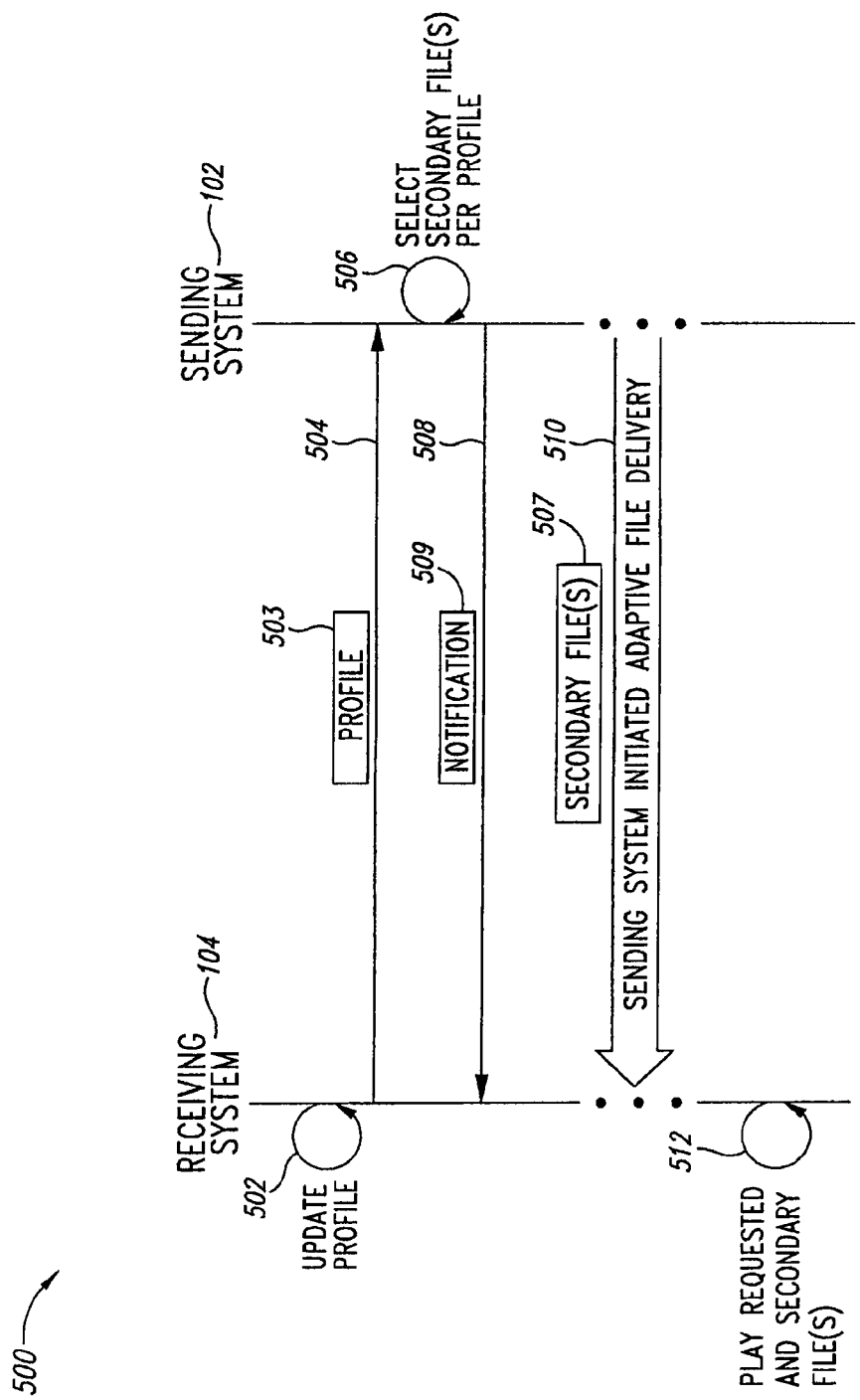
FIG. 5 is an interaction diagram depicting an implementation of the adaptive file delivery system as sending system initiated.

An implementation 500 of the adaptive file delivery system 100 is depicted in FIG. 5 with the receiving system 104 updating (step 502) a profile 503 and sending (step 504) the profile to the sending system 102. In some versions of the implementation 500, on a periodic or other continuing basis, the profile 503 can be updated and sent to the sending system 102. The profile 503 may be initially empty of pre-populated with certain data, but overtime, data in the profile is generally updated and refined according to observations of one or more users of the receiving system 104 as further described below. The sending system 102 selects (step 506) secondary files 507 in accordance with an association with the profile 503 to be sent to the receiving system 104. The association between the secondary file selection and the profile 503 can be done in any of a variety of ways depending on predetermined or otherwise obtained strategies such as advertising and/or marketing strategies.

In some versions of the implementation 500, the sending system 102 sends (step 508) a notification 509 to the receiving system 104. The notification 509 notifies the receiving system 104 that the sending system 102 will be sending the selected secondary files 507 to the receiving system through adaptive file delivery since the receiving system has not requested the secondary files. Over a time span, the sending system 102 sends the secondary files 507 to the receiving system 104 through adaptive file delivery initiated by the sending system (step 510). The sending system 102 and/or the receiving system 104 records what content of the secondary files 507 have been stored in the receiving system 104.

In some versions of the implementation 500, space on storage 122 for storage of the secondary files 507 is highly scrutinized an kept to a minimum and outdated secondary files are readily deleted. In other implementations, deletion management may be left up to a user of the receiving system 104. The receiving system 104 then plays (step 512) the secondary files intermixed with other files that were requested and received by the receiving system.

Versions of the implementation 500 can be used for caching of the secondary files 507 as advertisements and other messages having rich media content on to the storage 122 of the receiving system 104. The cached secondary files can be later played back as inserted along with playback of requested files requested by the receiving system 104 such as files having entertainment, educational, or other content having formats of movies, music, text, games, etc. Versions of the implementation 500 can be used in financial revenue models, in addition to subscription and pay-per-view for example, that operators and content owners can use to reduce the cost of offering media to consumers and/or increase the profitability of their services. Third parties can pay funds to operators to send third party messages to users of the receiving systems 104 via the adaptive file delivery of the secondary files 507 of the implementation 500.

Advertising and other message content is sent to the receiving systems 104 through the implementation 500 using adaptive file delivery as a background transfer with or without a delivery deadline, in some versions, during periods when the receiving system is not otherwise receiving content that was requested by the receiving system. Once stored on the receiving system 104, the secondary files 507 sent through the implementation 500 can be inserted before, during, or after play of a requested file, such as a movie for example. For instance, before, during or after playback of the entertainment content, the receiving system 104 may access and play one or more of the secondary files 507, such as advertising files, by pausing playback of the requested file being played for its entertainment content. How the receiving system 104 detects opportunities to play the secondary files 507 can be done with similar approaches as with conventional broadcasting industry practices such as explicitly imbedded signals in the entertainment content resulting in fade-to-black effects or other program marker effects. Secondary file content to be played can be chosen by the receiving system 104 based upon the profile 503, but could also be random, and/or based on type of playback device, and/or time of day, and/or type of entertainment or other content being played, and/or requested file content type, and/or user logon identification and/or other criteria.

Content of the secondary files 507 may be adjusted to particular consumer data, which is stored in the profile 503 sent from the receiving system 104 to the sending system 102 before the adaptive file delivery of the secondary files 507. Data in the profile 503 can be correlated by the receiving system 104 to requested file content type, online ordering habits, and so on. When used for advertising, the secondary files 507 are stored in the receiving system 104 with the requested files. Since users of the receiving system 104 can be potential customers, adjustment of content of the secondary files 507 to match the profiles of these potential customers may help to increase effectiveness of advertisements contained in the secondary files to be more targeted toward a particular audience.

Content of the profiles 507 may include, but is not limited to, receiving system user identity, and/or purchase records such as those records involving online ordering via interactive browser interfaces. Other data can include records of entertainment content description (title, genre, etc.) date of play, compiled data from surveys of user preferences, buying habits, expressed interests, how often advertising content was played and so on. As with other implementations of the adaptive file delivery system, it is understood that the sending system 102 including the storage 114 can include one or more mass storage devices networked together but geographically separated.

An implementation 600 of the adaptive file delivery system 100 is depicted in FIGS. 6-11. The implementation 600 allows a user 602 to use an input device 604, such a computer workstation, personal data assistant (pda), cell phone, game console or other device, either located separately or part of the receiving system 104 to perform functions such as viewing, prioritizing, and manipulating delivery deadlines and delivery order of various files that are to be sent via adaptive file delivery from the sending system 102 to the receiving system. As is the case with other implementations, the sending system 102 can be one or more physical units that may be networked together but geographically separated using ordinary commercial networking equipment.

Versions of the implementation 600 have various activities that occur at different times that can be widely separated from one another such as selection, delivery, and playing of files. The users 602 can control the selection of files to be delivered, delivery deadlines, and priority and/or order for delivery through the input device 604.

The implementation 600 controls delivery and delivery status of files to be delivered by various forms of adaptive file delivery. Some aspects of system requirements and goals of the implementation 600 can be understood to a degree under analogous terms with physical postal delivery of purchased goods to consumers. On the other hand, other aspects of the implementation 600 are unique, for example, involving electronic delivery of digital content to meet a deadline. For example, one exemplary aspect of the implementation involves the reception of a content file in which reception is not a single event but distributed in time over an interval. Aspects are involved with the users 602 interacting with the implementation 600 during adaptive file delivery of files, such as media content files, with associated delivery deadlines.

Figure 6:
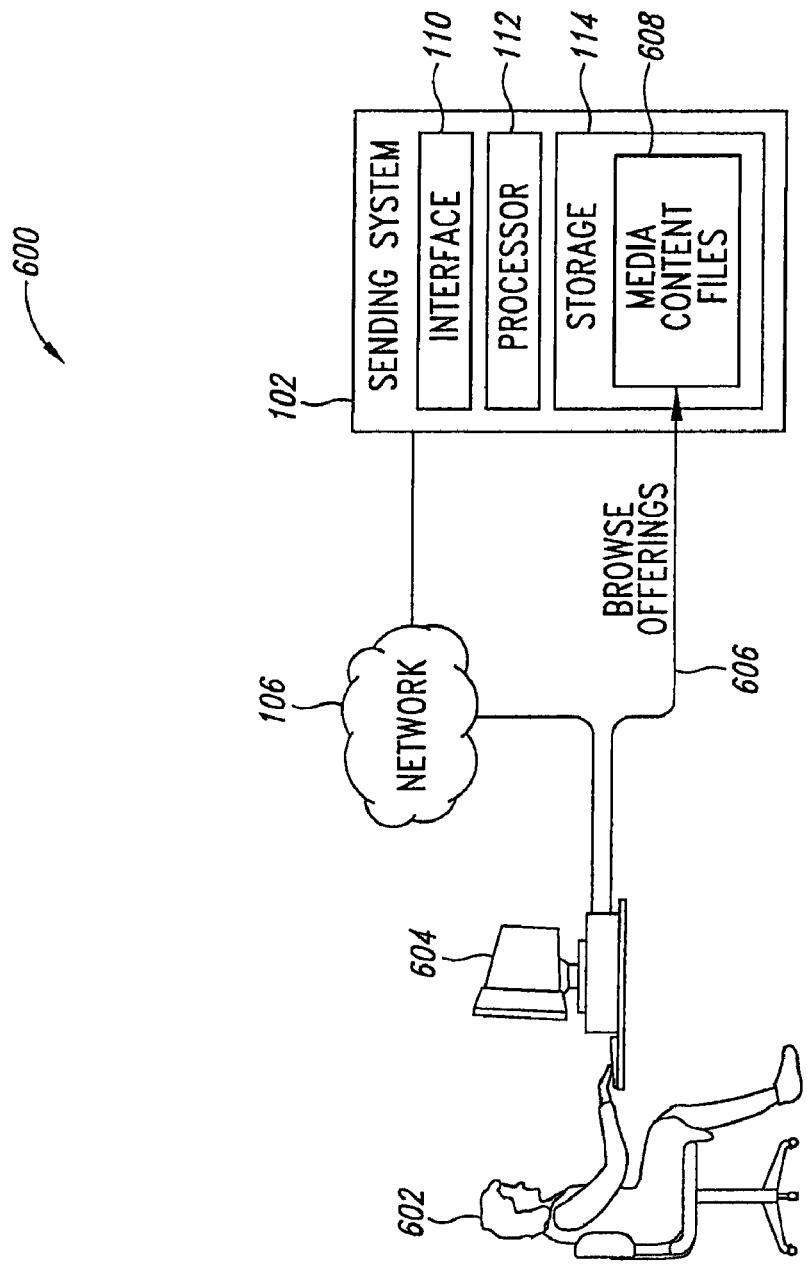
FIG. 6 is a schematic diagram depicting an implementation of the adaptive file delivery system with browsing by a user.

As depicted in FIG. 6, the user 602 is using the input device 604 that is communicatively linked through a wireless, wired, network, telephony, or other communication medium to the sending system 102. The input device 604 can be operating a form of a browser type application to assist the user 602 to browse (step 606) files, such as media content files, stored on the sending system 102 available for adaptive file delivery.

Figure 7:
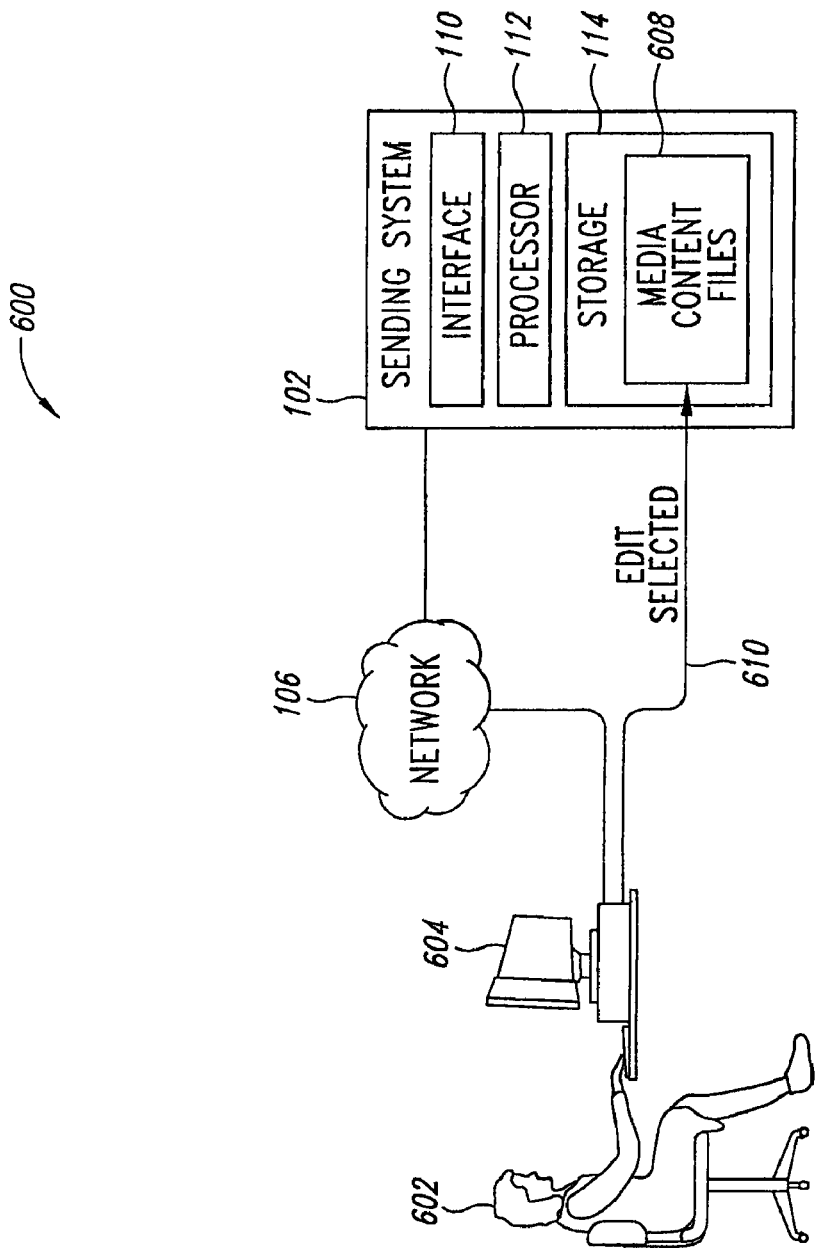
FIG. 7 is a schematic diagram of the implementation of FIG. 6 with editing by a user.

As depicted in FIG. 7, the user 602 may optionally view through the input device 604 content files already delivered to the receiving system 102 that can collectively form an existing personal media content library for the user. The user 602 may optionally choose to mark (step 610) with the input device 604 certain content files stored on the receiving system 104 for deletion so that there is sufficient storage room for new content files to be delivered to the receiving system.

Figure 8:
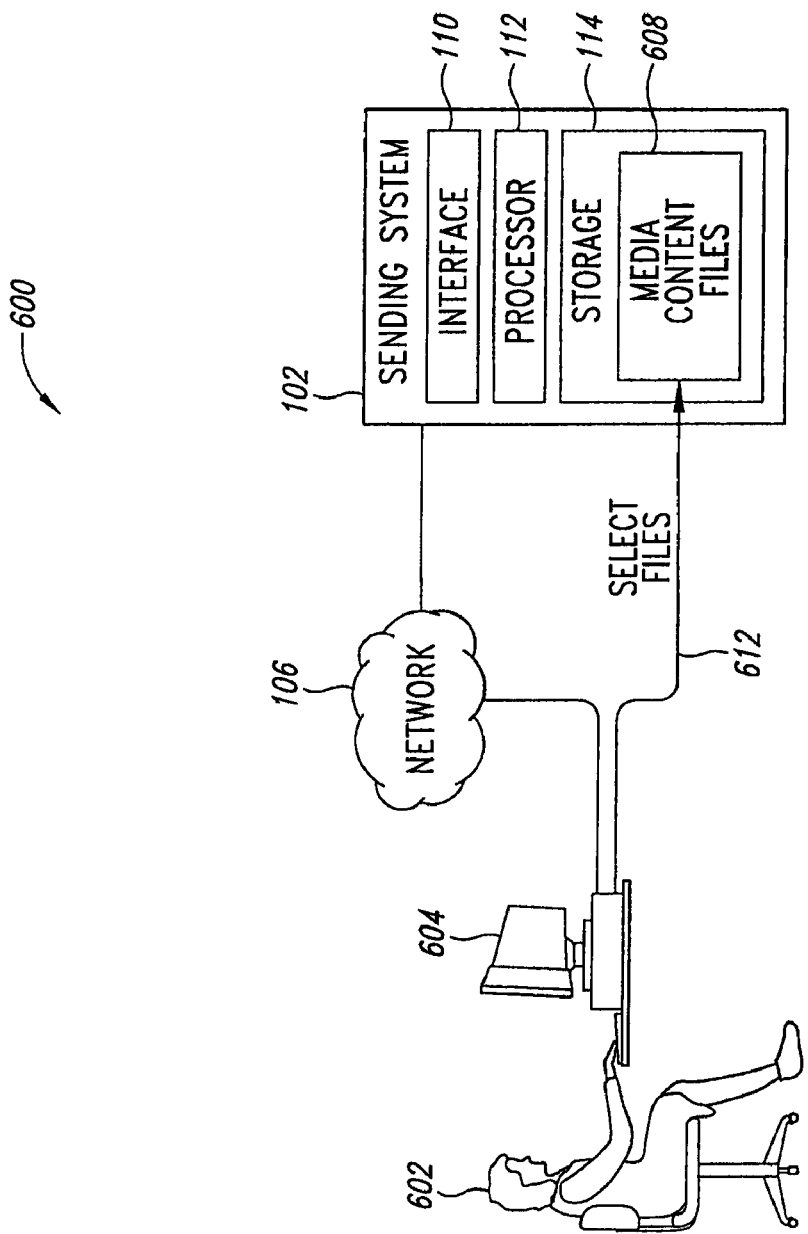
FIG. 8 is a schematic diagram of the implementation of FIG. 6 with file selection by a user.
Figure 9:
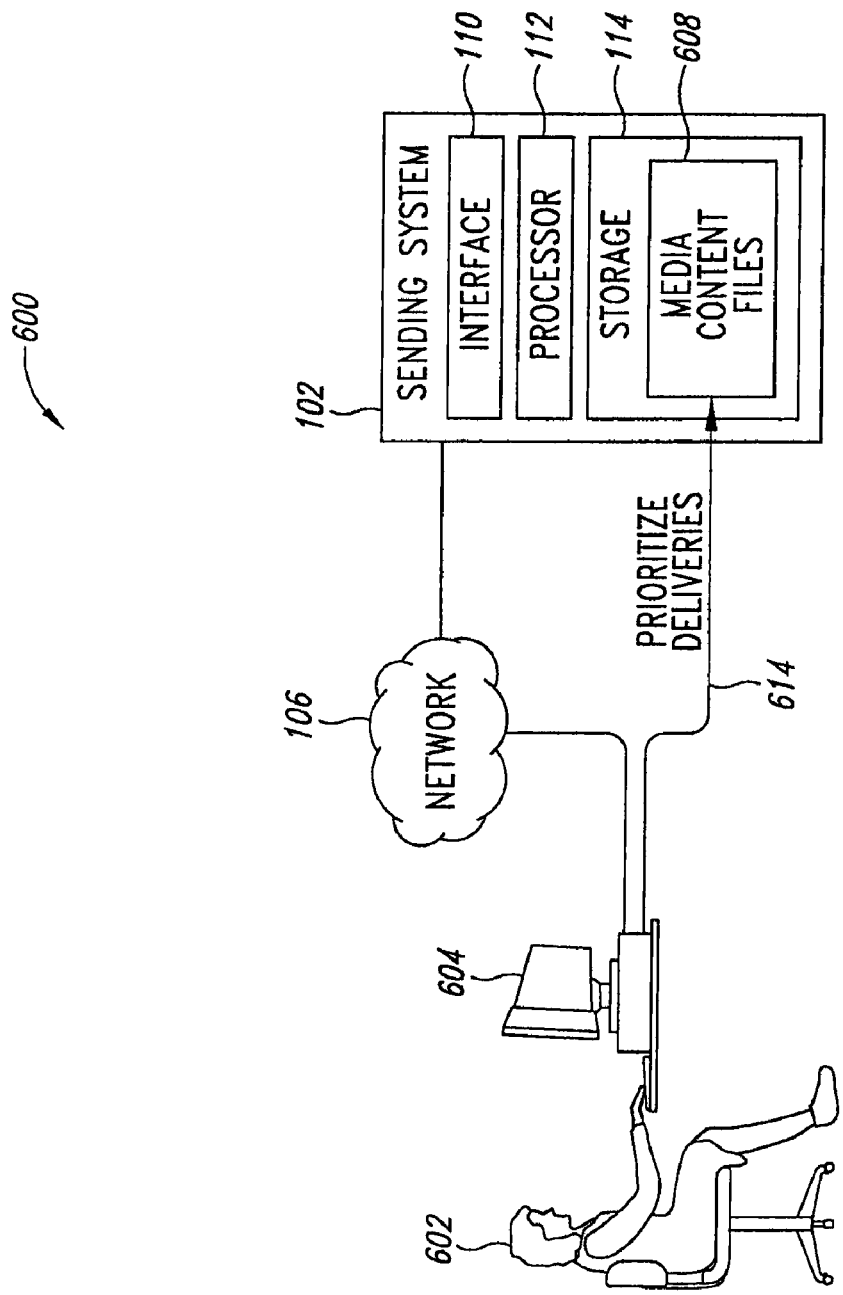
FIG. 9 is a schematic diagram of the implementation of FIG. 6 with prioritization by a user.

As depicted in FIG. 8, the user 602 by using the input device 604 can select (step 612) one or more media content files for delivery. In versions of the implementation 600 an original order of delivery of selected files is generated based upon the sequence in which the files were selected. As shown in FIG. 9, the user 602 may optionally revise priorities (step 614) of the original order of delivery of the selected media content files as desired.

Figure 10:
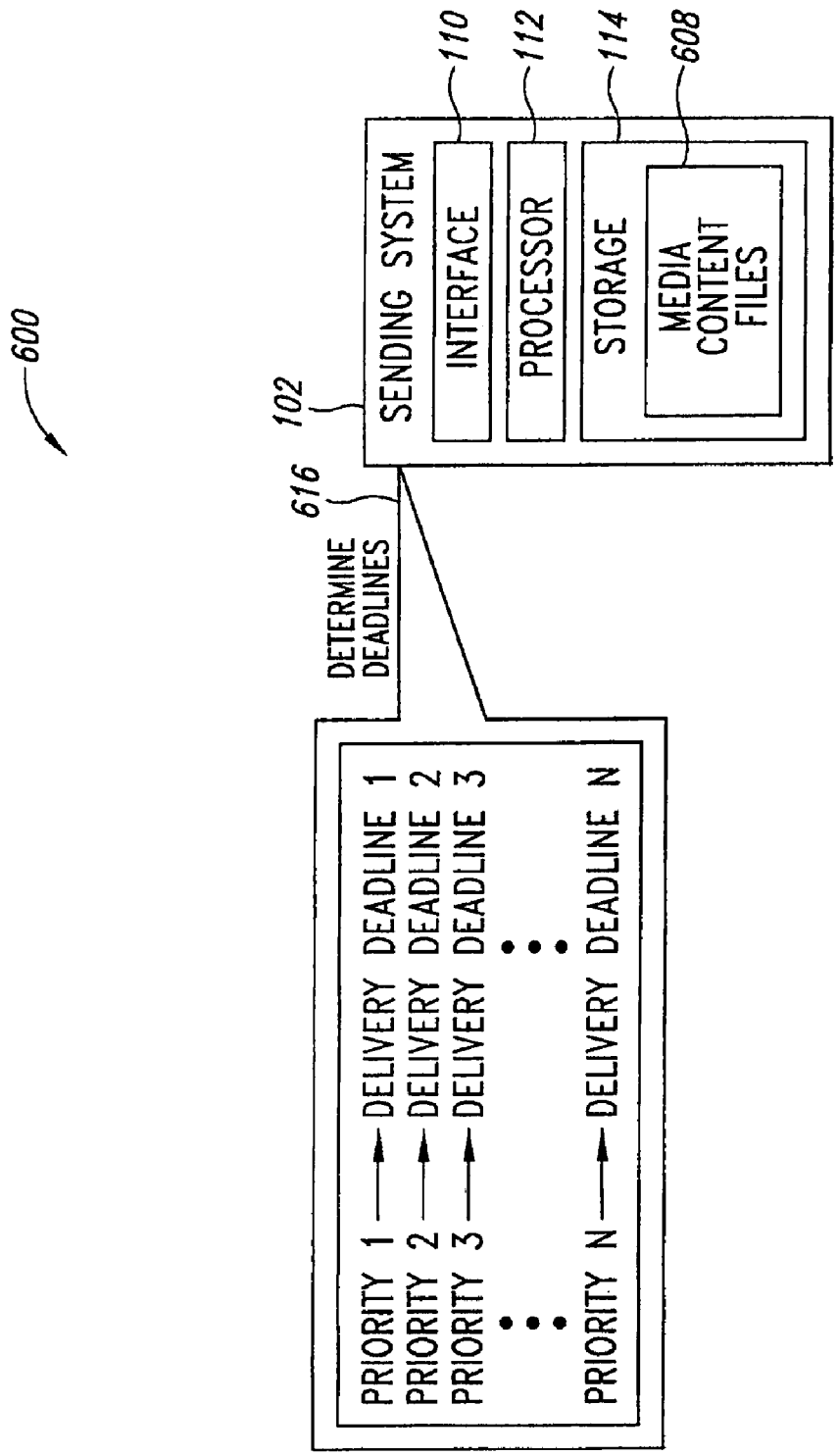
FIG. 10 is a schematic diagram of a portion of the implementation of FIG. 6 with deadline calculation.

As depicted in FIG. 10, the sending system 102 will calculate (step 616) expected delivery deadlines for the pending adaptive file deliveries. The expected delivery performance of the sending system 102 may be based on, but is not limited to, displayed and/or inputted delivery priorities, subscription profile of the user 602, stored historical network delivery performance data and current network conditions as obtained by the sending system.

In some versions, the sending system 102 may present to a user the delivery deadline calculated by the sending system from the sum of an expected delivery deadline plus some additional time delta to allow for unpredicted network slow downs and/or outages.

In other versions, the sending system 102 may allow a user to select a delivery deadline as long as the selected delivery deadline exceeds the expected delivery deadline calculated by the sending system plus some additional time delta. In these versions, the system 100 may record and bill the user according to the length of the user's chosen delivery deadline.

In some versions of the implementation 600, delivery of the highest priority file will happen earliest, followed by the next highest priority, and so on. Results of this expected delivery deadlines calculation can be presented to the user 602 through the input device 604 in graphical and/or textual fashion. In some versions of the implementation 600 the user 602 may approve of the delivery calculation results to further initiate adaptive file delivery.

Figure 11:
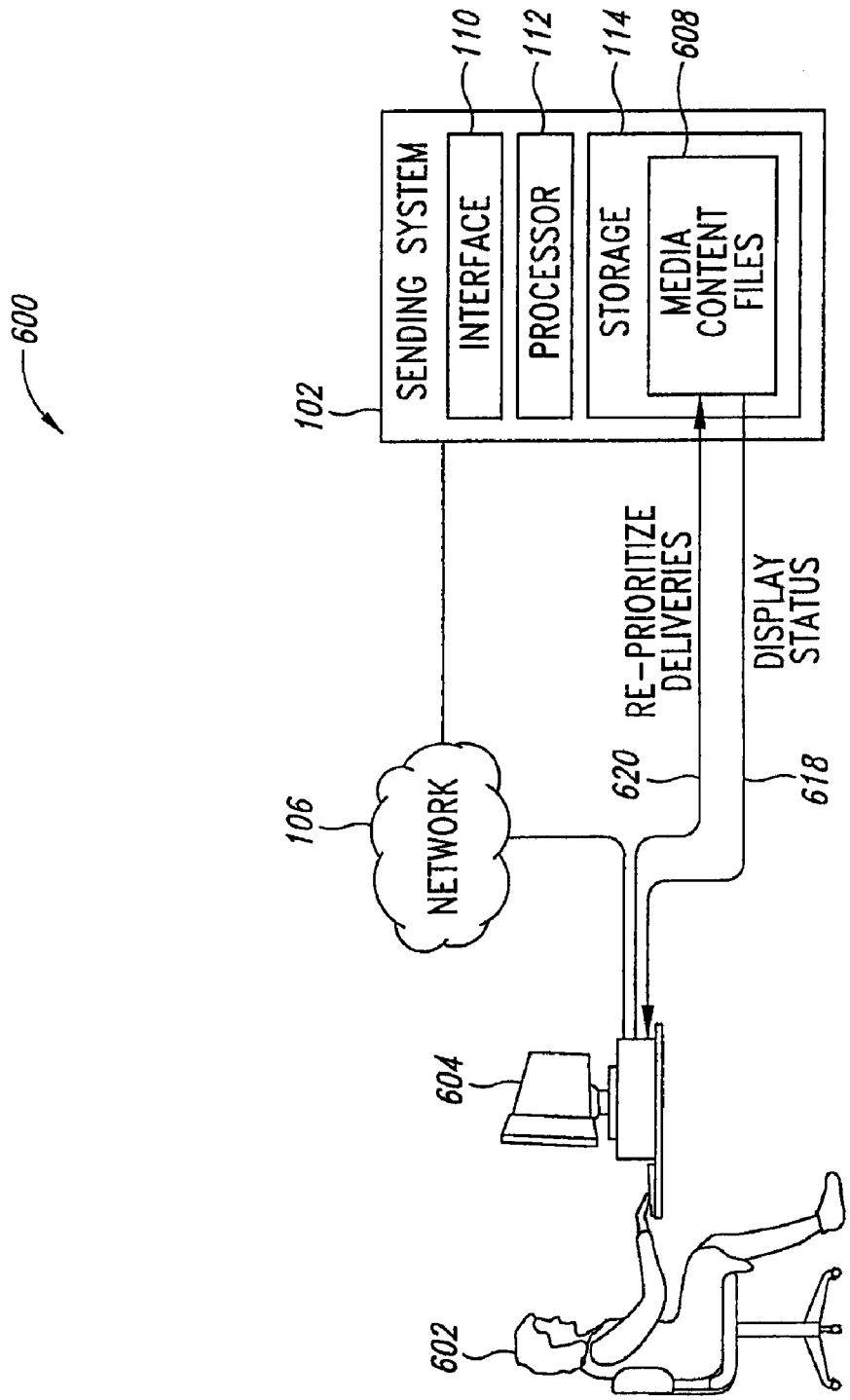
FIG. 11 is a schematic diagram of the implementation of FIG. 6 with status display and user interaction.

As depicted in FIG. 11, as adaptive file deliveries are occurring with the implementation 600, the sending system will display (step 618) through the input device 604 a delivery schedule associated with the adaptive file deliveries so that the user 602 can edit (step 620) the delivery schedule. Through editing of the displayed delivery schedule, priorities of one or more pending adaptive file deliveries can be re-prioritized or canceled.

In some versions of the implementation 600, if delivery of a file has proceeded beyond a certain pre-selected point in terms of the fraction of the delivered file, the user 602 may not be allowed to cancel the order without some service penalty. New selections of content files can be added to the delivery schedule displayed on the input device 604 and similarly be reprioritized by the user 602.

After reprioritization, the sending system 102 will again calculate (step 616) a new schedule of pending adaptive file deliveries and display (step 618) the newly calculated schedule on the input device 604 to the user 602. The sequence of editing the displayed delivery schedule, recalculation of the edited schedule, and display of the recalculated schedule can be repeated as often as desired by the user 604 given that there may be some service penalties involved, such as canceling a file that has been already partially delivered beyond a certain maximum portion.

Figure 12:
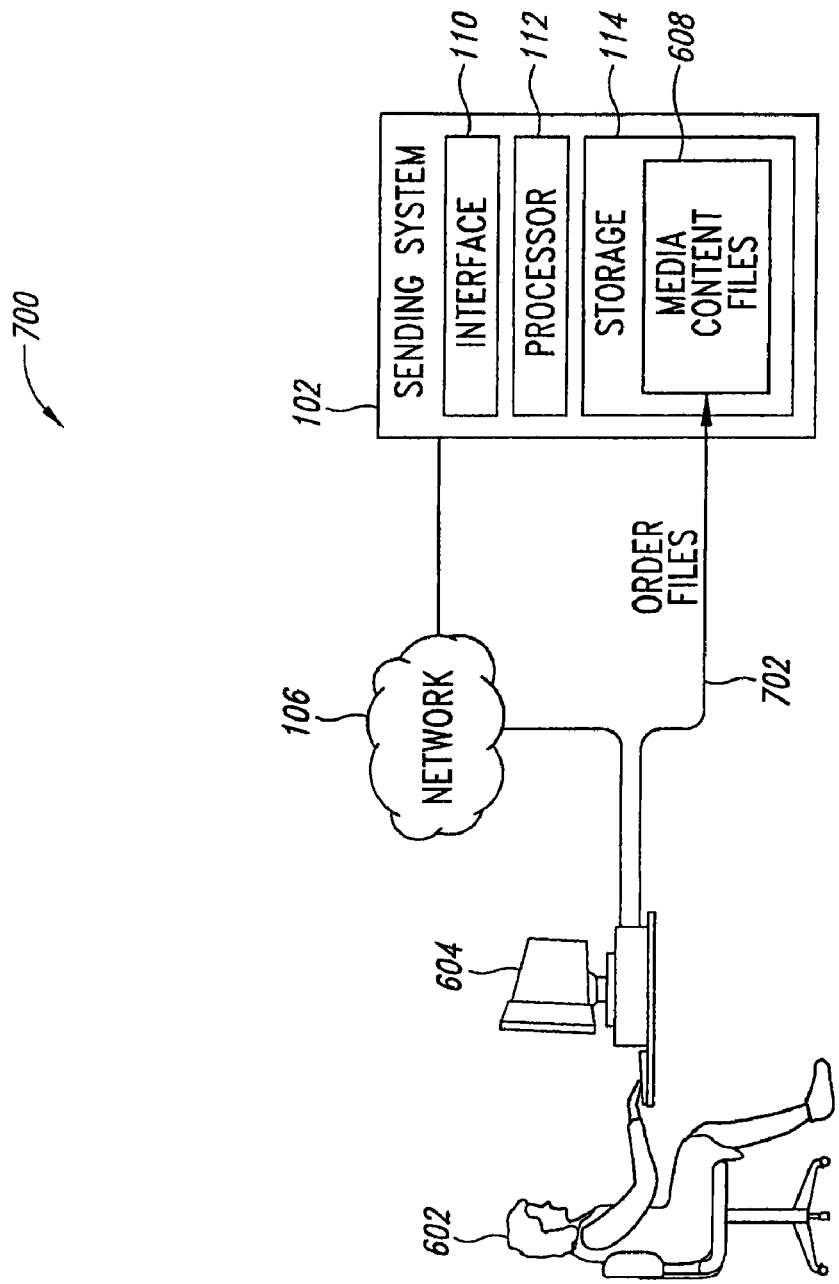
FIG. 12 is a schematic diagram of an implementation of the adaptive file delivery system with file ordering by a user.
Figure 13:
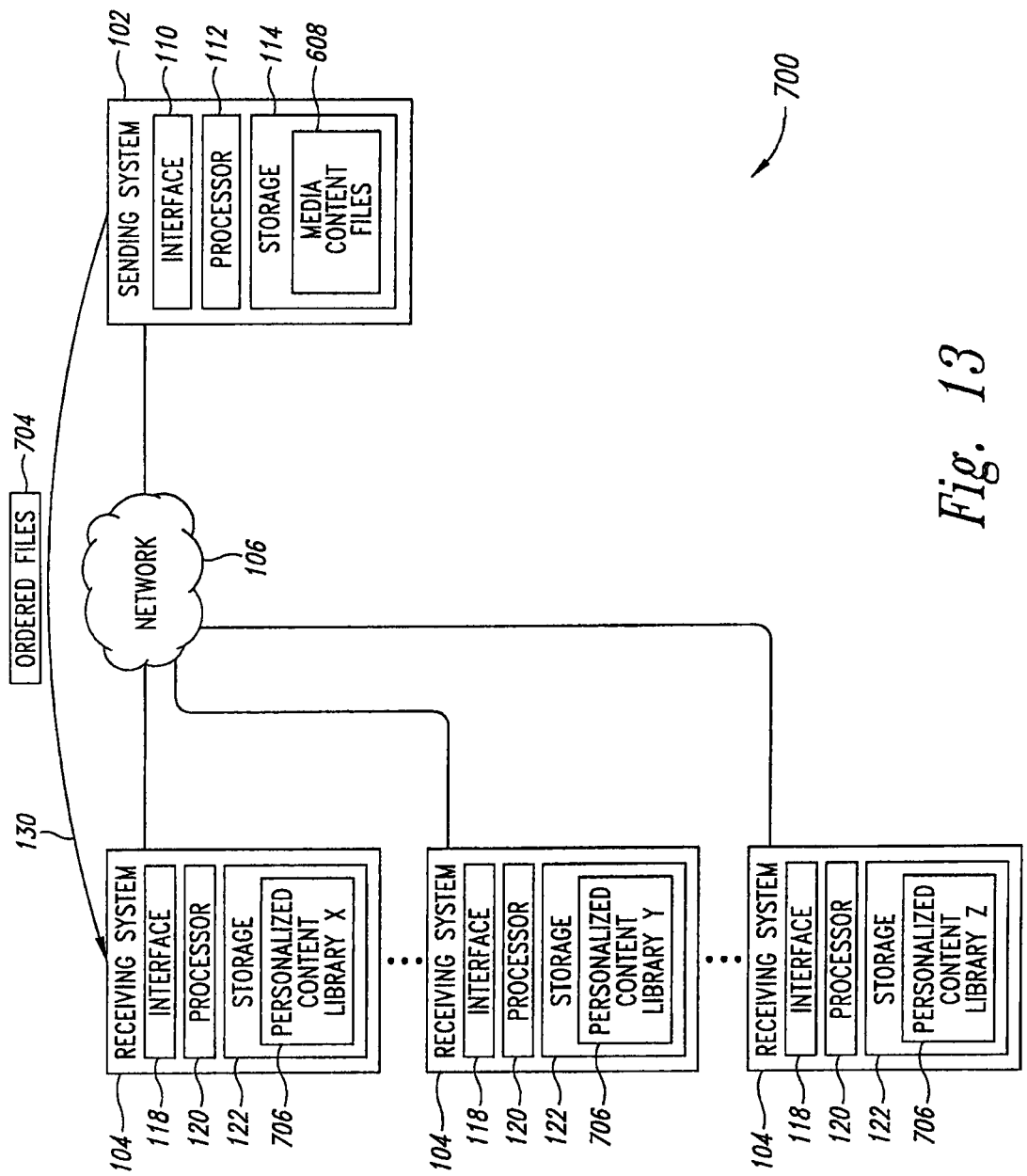
FIG. 13 is a schematic diagram of the implementation of the adaptive file delivery system of FIG. 12 with delivery of ordered files.
Figure 14:
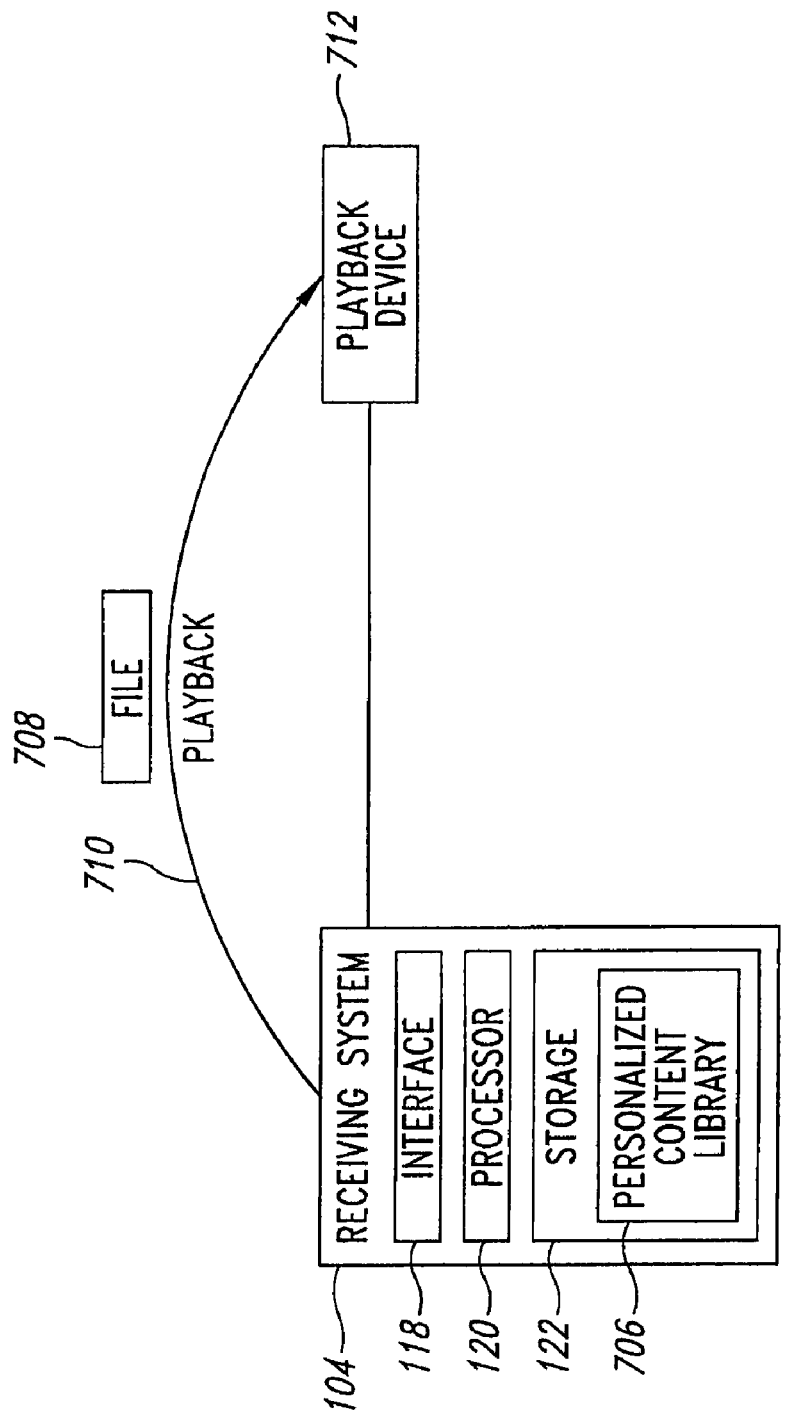
FIG. 14 is a schematic diagram of the implementation of the adaptive file delivery system of FIG. 12 showing detail of file playback.

An implementation 700 is depicted in FIGS. 12-14 to allow for a user-customized library of media content, such as a personalized content library. The personalized content library can be stored locally at the user's home or business on either the receiving system 102 or a variety of content storage units associated and/or communicatively linked to the receiving system such as mass-storage enabled devices such as digital video recorders (DVRs), portable media centers (PMCs), network-attached storage units, PCs, cell phones, etc. in addition to the receiving system. The user 602 interacts with the implementation 700 in three phases: selecting media files, adaptive file delivery of the selected media files, and playback of delivered content.

As depicted in FIG. 12, the user 602 uses the input device 604 to select and order (step 702) files from the sending system 102. Ordering of files may involve a monetary transaction either at time of the order, through a subscription plan, cumulated with periodic billing, or another arrangement. File selection and ordering by the user is supported by the input device 604, which can furnish a presentation via web browser, or other presentation display of a file listing such as a media catalog. Each file selection is associated with a delivery deadline that is calculated and managed by the sending system 102.

As depicted in FIG. 13, the sending system 102 manages adaptive file deliveries of ordered files 704 the selected content files to the receiving systems 102 of various users 602 to build a personal content library 706 of media files on each of the receiving systems 104.

Alternatively, adaptive file deliveries of ordered files 704 can be made to one of the receiving systems 104 to build a single main personal content library 706. In turn, the receiving system 104 can be communicatively linked to a plurality of devices to store in smaller personal content libraries 706 and/or play the delivered files.

As depicted in FIG. 14, once the media files are delivered to the receiving system 104 to constitute the personal content library 706, a selected file 708 of the personal content library can be played (step 710) on a playback device 712 either as part of or separate from the receiving system 104. Once files are in the personal content library 706, they can be played back as desired without further interaction with the delivery network 106 or the sending system 102. Play of the files in the personal content library 706 can be thus isolated from adverse conditions experienced on the network 106 and/or sending system 102.

Versions of the implementation 700 can be used for remote ordering to allow consumers to interact with the sending system 102 as a remote online store server system via a browser to place orders for future delivery of large media files such as movies to their home content storage units (e.g. DVR) in a time frame governed by deadlines.

The ordering experience can be enhanced by the sending system 102 offering suggestions of content expected to be of interest to the consumer. For instance, a consumer can search for one or more content files for delivery and thereby be presented with a suggested list of content files based on a profile of the consumer passed to the sending system 102 by the receiving system 104. The consumer profile may be based on previously ordered content file genres, trusted friend recommendations, subscription lists of serialized features, sequels to previously selected content, purchasing habits, and so on. The consumer can also search for available content in a database of available titles using search terms that may include but are not limited to title, author, director, genre, rating, sex/violence/language content profiles, performers, language, playback format, consumer ratings, reviews ratings, and so on. The consumer can then make a selection of one or more content files for delivery within a deadline associated with each content file.

As implementation 800 of the adaptive file delivery system 100 is depicted in FIGS. 15-19 which involves separating scheduled delivery deadlines from scheduled releases dates that the delivered files can be played to assist in reducing or avoiding demand peaks for popular content. The implementation 800 allows digitized media files to be delivered electronically via adaptive file delivery to the receiving systems 104 which can include or be communicatively linked to a collection of content storage units over the network 106 as a single network or collection of networks in advance of a predetermined release date. The release date refers to a pre-scheduled date where previously unavailable content is made available for playback by a group of users.

For instance, content of files to be delivered could be new movies or episodes in an entertainment series that have not yet been generally available. The adaptive file delivery can be planned to be completed sufficiently in advance of the release date associated with the content of the delivered files to offer highly probable guarantees of file delivery before the release date. By separating distribution by adaptive file delivery from the release date, large groups of consumers may have concurrent access to media on a particular release date without requiring a large bandwidth broadcast delivery system or otherwise straining delivery networks to accommodate large peaks in demand on the release date for popular content. Once distributed, consumers can playback content on or after the release date as desired or according to some other subscription plan.

Figure 15:
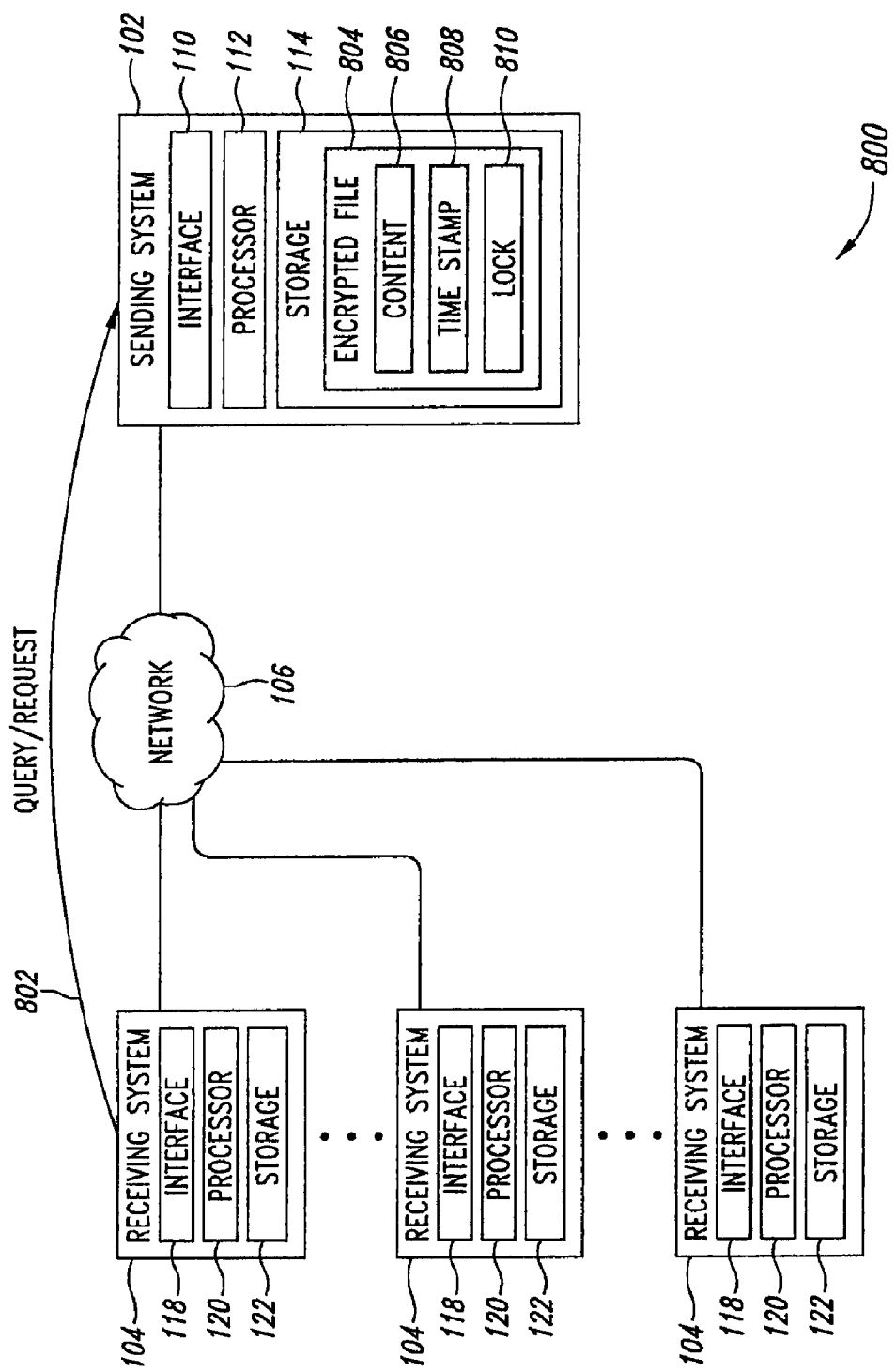
FIG. 15 is a schematic diagram of an implementation of the adaptive file delivery system with encrypted files and showing a query stage.

As depicted in FIG. 15, a plurality of the receiving systems 104 query (step 802) the sending server 102 for new content files that may have become available. The query (step 802) could alternatively be done through use on the input device 604 as described above. These queries can be automatically performed by the receiving systems 104 and/or the input devices 602 or could be manually performed by users of the receiving systems and the input devices. The sending system 102 is shown to have an encrypted file 804 with content 806, a time stamp 808, and a lock 810 representing encryption of the file content.

Figure 16:
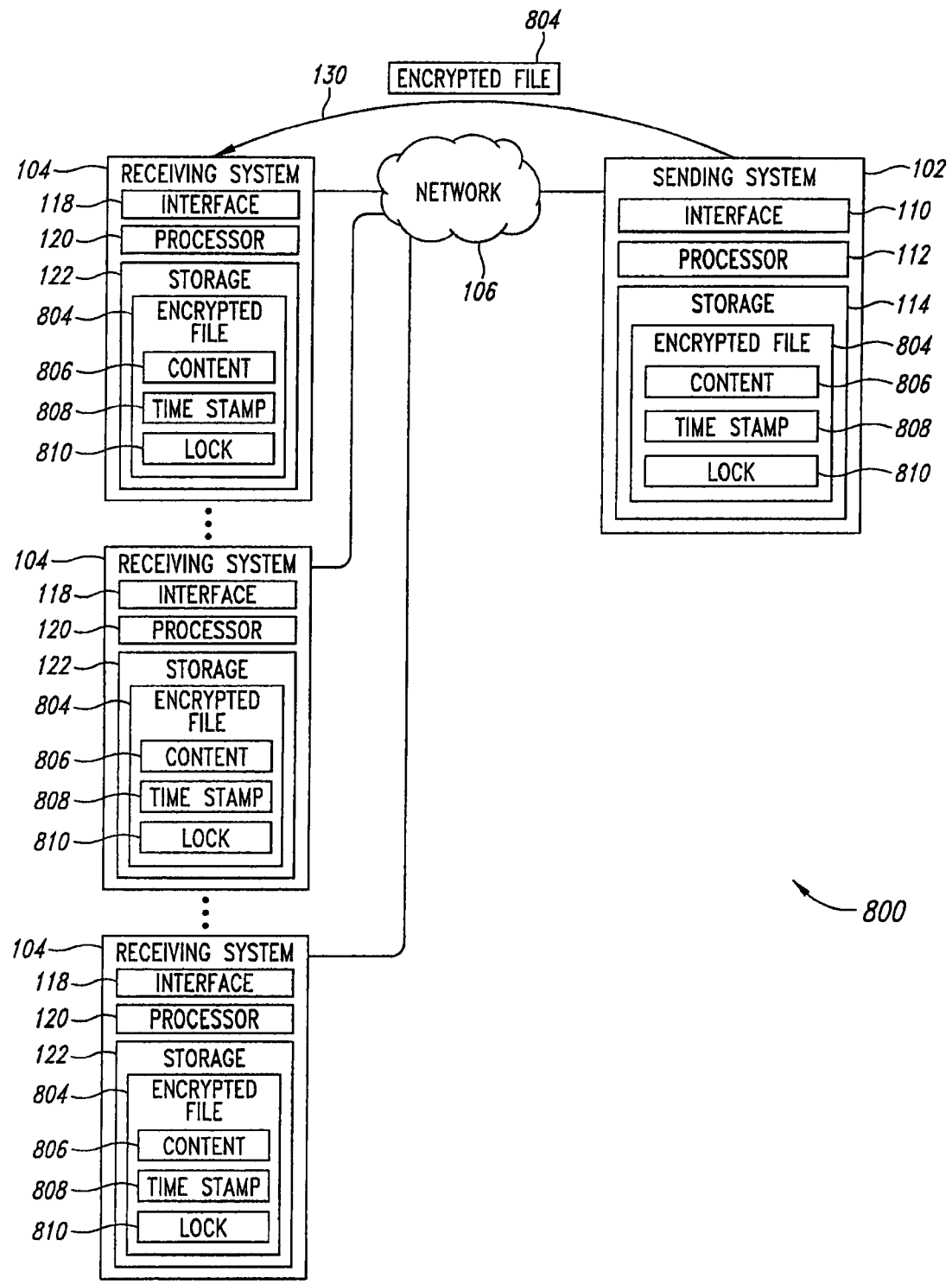
FIG. 16 is a schematic diagram of the implementation of the adaptive file delivery system of FIG. 15 showing delivery of an encrypted file.

As depicted in FIG. 16, the sending system 102 delivers the encrypted file 804 through adaptive file delivery to the receiving systems 104 based upon any number of ordering schemes such as delivering any files becoming available on the sending system or delivering only those files selected according to a list stored on the sending system and/or stored on the receiving systems or delivering only those files according to manual selection by users of the receiving systems, etc. For instance, the collection of eligible ones of the receiving systems 104 for a given content file may be determined through use of preconfigured subscription lists which might include some or all of a group of the receiving systems linked to a certain portion of the network 106.

In this example, the content 806 of the encrypted file 804 is protected against early release via ordinary digital encryption methods that require a decryption key in order to be decrypted and played. The encrypted file 804 has associated unencrypted meta-data including but not limited to the timestamp 808 that indicates the future release date for the content 806 of the encrypted file. Once delivered, the receiving system 104 can access this meta-data to provide graphical or textual browser type interfaces to a consumer indicating that the content is not yet available, and indicating when the release date will occur.

Figure 17:
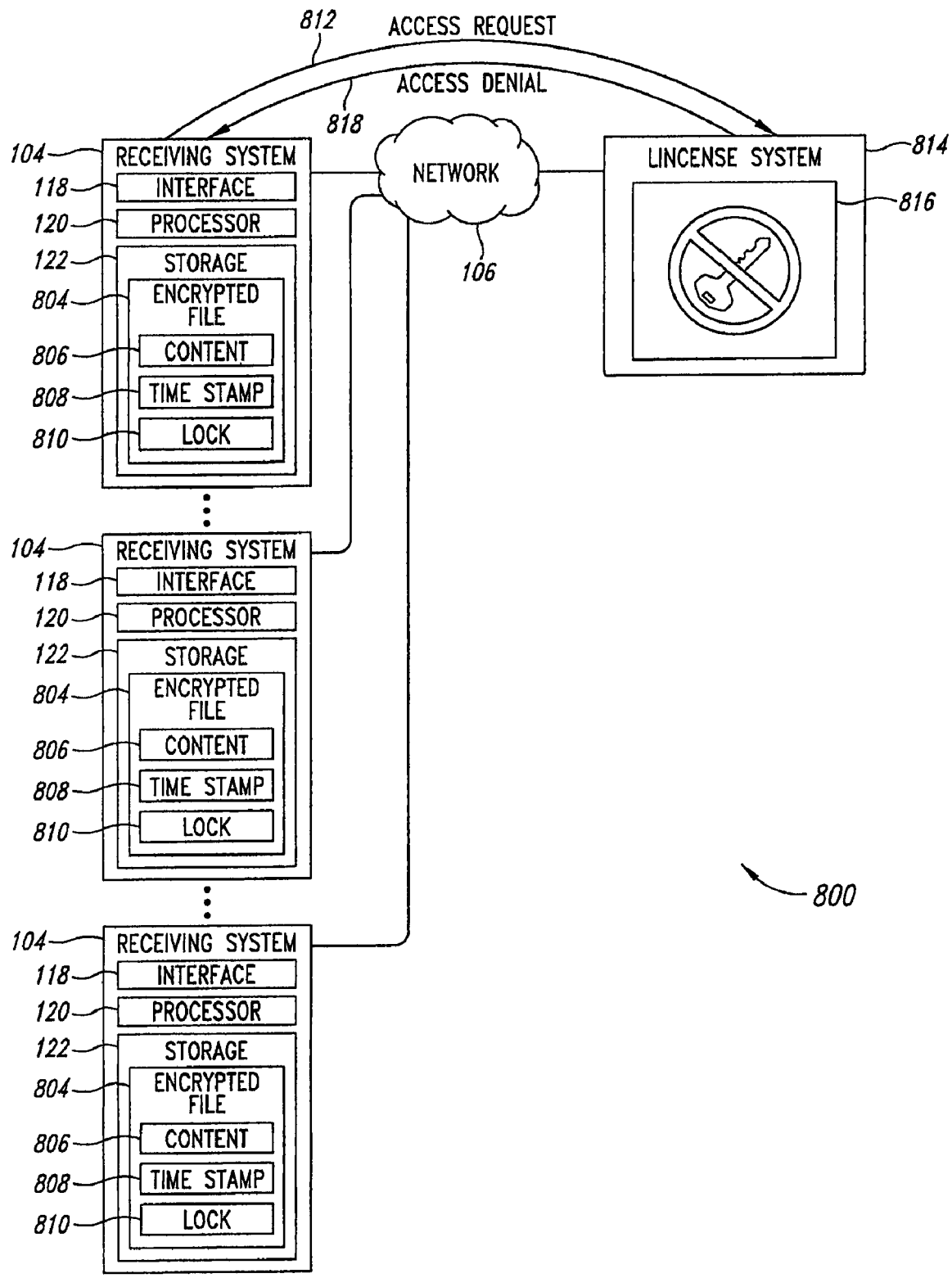
FIG. 17 is a schematic diagram of the implementation of the adaptive file delivery system of FIG. 15 showing an access request and an access denial.

As depicted in FIG. 17, after the encrypted file 804 has been sent to the receiving system 104 via adaptive file delivery, the receiving system attempts to play the encrypted file 804 by performing an access request (step 812) to a license system 814 to request an appropriated decryption key. An indicated in FIG. 17, the appropriate decryption key has been currently stored on the license system 814 as unavailable decryption key 816. In some versions of the implementation 800, the license system 814 may be the sending system 102 or another system.

The license system 814 replies with an access denial (step 818). In some versions of the implementation 800, the receiving system 104 first verifies before sending an access request by comparing its own internal clock with the timestamp 808 of the encrypted file 804 already stored on the receiving system. In some versions of the implementation 800, since the receiving system's internal clock may be vulnerable to hacking or errors, as a secondary protection against unintended access, the receiving system 104 may be required to transact with the license system 814 as a system separate from the sending system 102 to obtain the decryption key for the encrypted file 804. In these versions, the license system 814 would maintain its own time reference that would aid in rejecting invalid requests by the receiving system 104.

Figure 18:
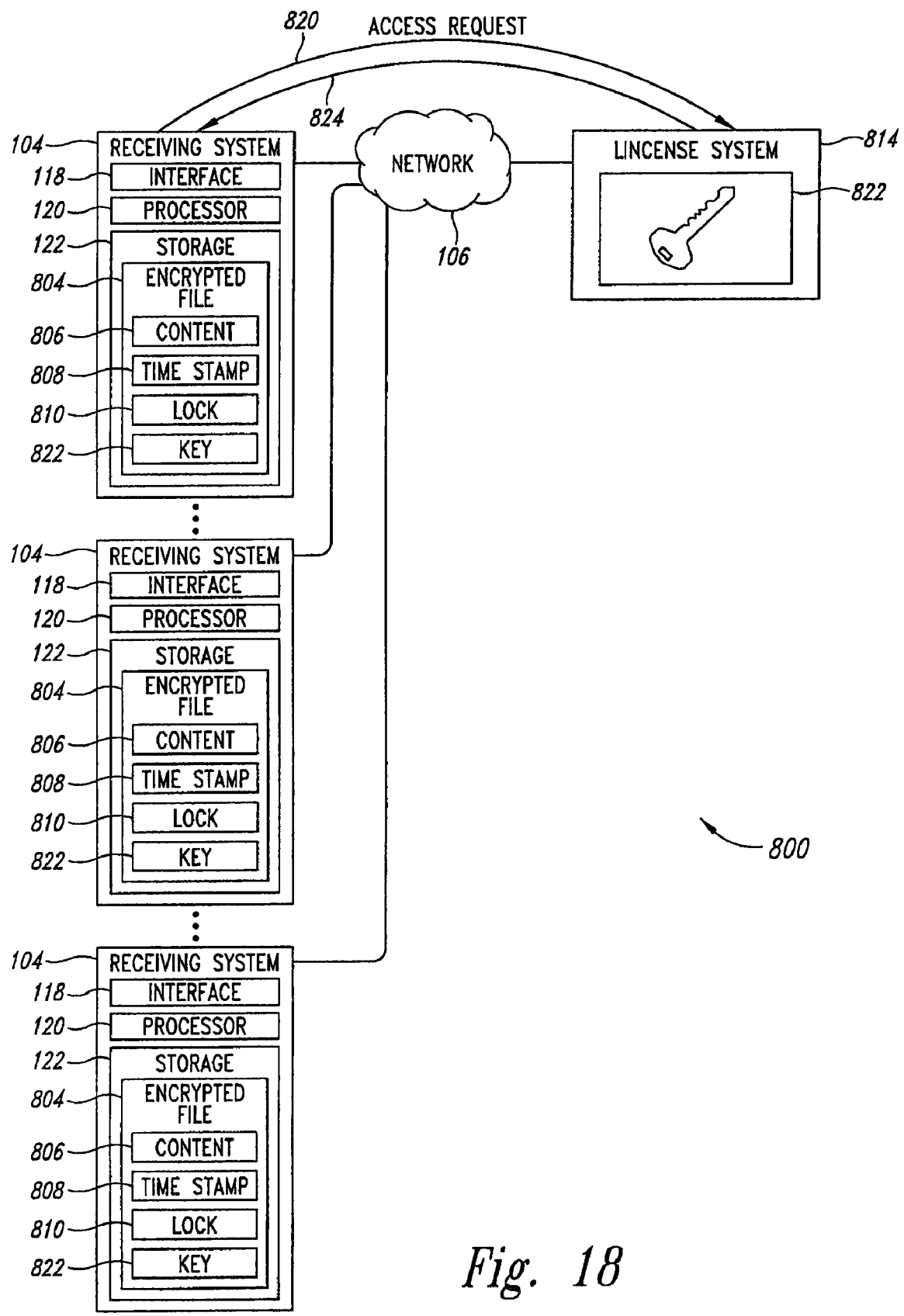
FIG. 18 is a schematic diagram of the implementation of the adaptive file delivery system of FIG. 15 showing an access request and an access allowance.

As depicted in FIG. 18, the receiving system 104 sends a valid access request (step 820) at or after the release date to the license system 814, which has stored the associated decryption key as an available decryption key 822. The license system 814 responds by transmitting the available decryption key 822 to the receiving system 104 for subsequent decryption and playback of the encrypted file 804.

Figure 19:
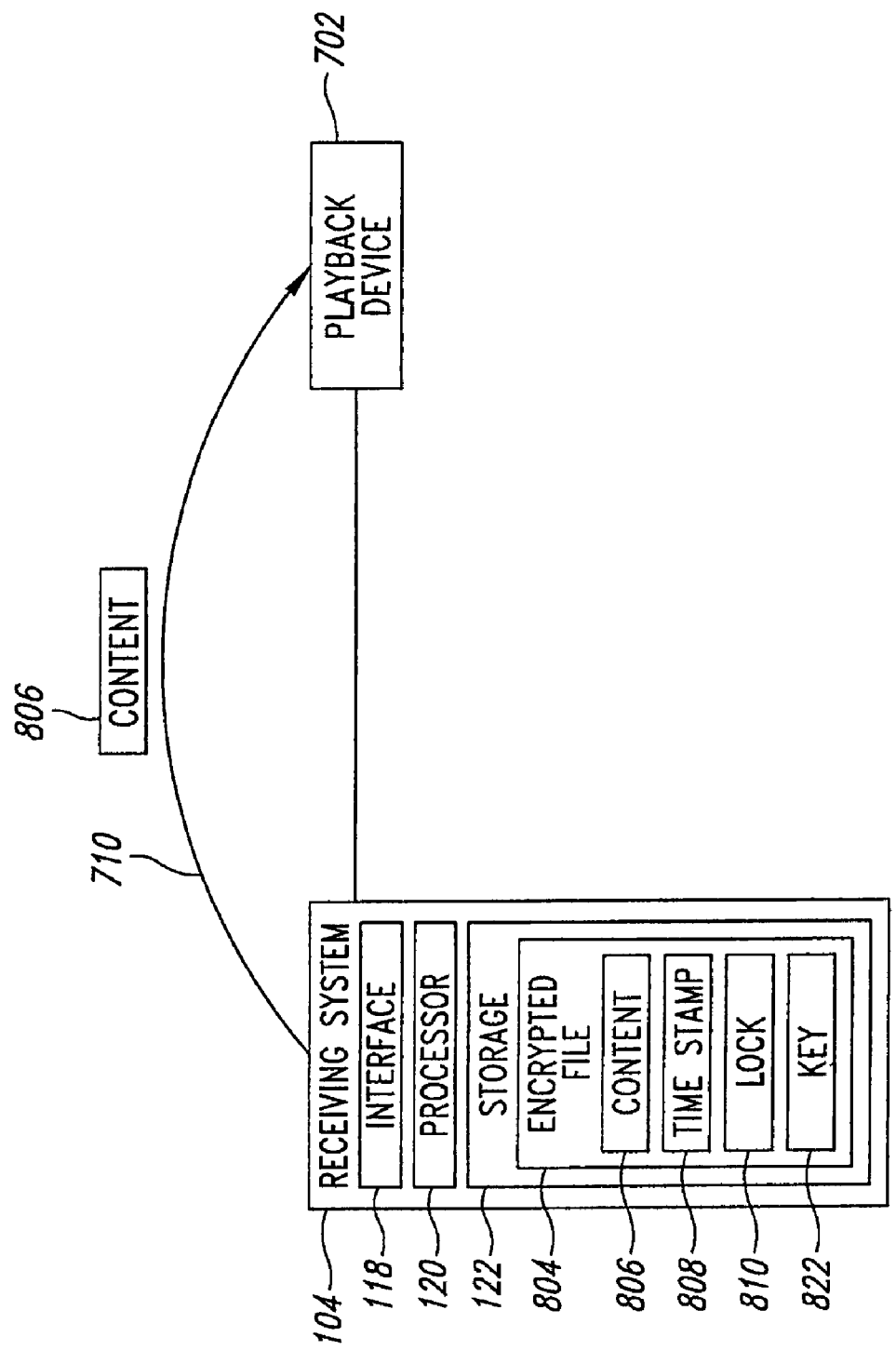
FIG. 19 is a schematic diagram of the implementation of the adaptive file delivery system of FIG. 15 showing detail of file playback.

As depicted in FIG. 19, the receiving system 104 has obtained and stored the available license key 822. Subsequent to obtaining the available license key 822, whenever the receiving system 104 begins to play the encrypted file 804 stored on the receiving system, the receiving system references this license key to allow authorized playback of the content. In some versions of the implementation 800, the license key 822 is stored on the receiving system in a manner to hinder subsequent unauthorized transmission of the license key to another receiving system.

Figure 20:
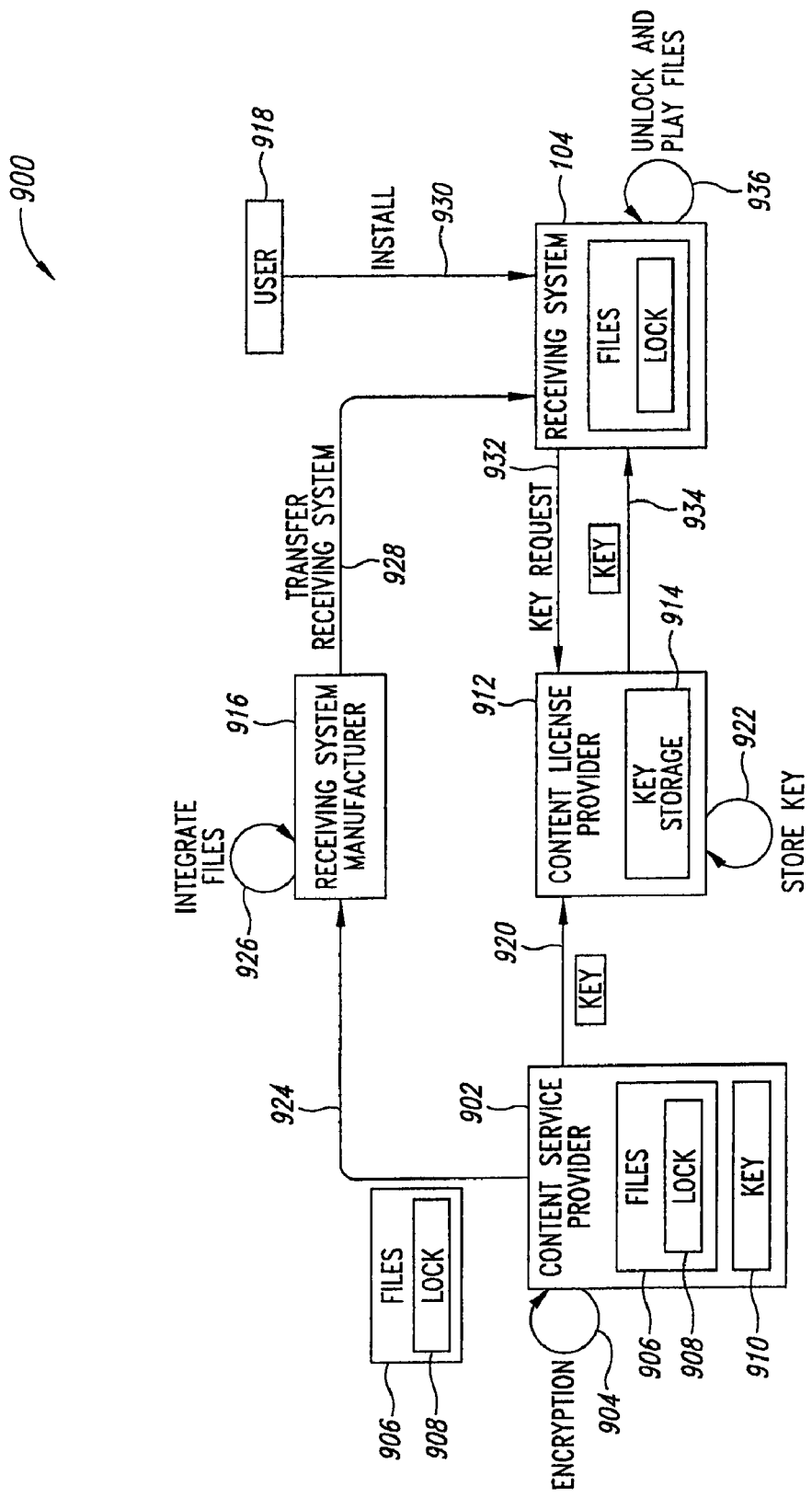
FIG. 20 is a schematic diagram of an implementation of the adaptive file delivery system showing pre-loading of files.

An implementation 900 of the adaptive file delivery system 100 directed to preloading content files into the receiving system 104 at time of manufacture of the receiving system is depicted in FIG. 20. Through the implementation 900 a preloaded content library is loaded into the receiving system 104 at the time of manufacture of the receiving system.

Since use of the adaptive file delivery system 100 to initially populate one of the personalized content libraries 706 may take an undesirable amount of time in certain circumstances, the implementation 900 allows for an initial collection of files for a personalized content library to be preloaded as a jumpstart to the adaptive file delivery with subsequent use of the adaptive file delivery to update and further expand the preloaded personalized content library. File selection for the personalized content library could be based upon various models such as indicated desires of an individual purchasing user, typical user types, or typical collection types, etc.

The implementation 900 includes a content service provider 902 that encrypts (step 904) files 906 being encrypted as represented by lock 908 and generates an associated key 910. The implementation 900 further includes the content license provider 912 having a key storage 914 for holding a copy of the key 910, a receiving system manufacturer 916, and a user 918. Although, as depicted, encryption may occur at the content service provider 902, in alternative versions, encryption occurs with the content license provider 912. Generally, the key 910 is stored with content license provider 912.

After encryption (step 904), the content service provider sends (step 920) a copy of the key 910 to the content license provider 912 for storage (step 922) in the key storage 914. If the content license provider 912 has performed encryption (step 904) then the license provider can proceed to storing the key 910. The content service provider 902 sends (step 924) a copy of the encrypted files 906 to the receiving system manufacturer 916 to integrate (step 926) the encrypted files 906 into copies of the receiving system 104 being manufactured.

A copy of the receiving system 104 is transferred (step 928) from the receiving system manufacturer 916 to the user 918 typically through a series of commercial exchanges. Once the user 918 has obtained the receiving system 104, the user typically performs an installation procedure with the receiving system (step 930) whereby a request is made (step 932) for a copy of the key 910 from the content license provider 912. In some versions, enabling a preloaded content library may be an option, which the user 918 may decline to pursue. In some versions of the implementation 900, the key request (step 932) is accomplished via an online browser session with an online store (not shown) associated with the content service provider 902.

During the browser session, the user 918 can indicate the hardware identification of the receiving system 104 that can be used by the license provider 912 to furnish a proper version of the key 910. The copy of the key 910 is sent (step 934) from the content license provider 912 to the receiving system 104. The copy of the key 910 is then used to decrypt and play (step 936) one or more of the encrypted files 906. In some versions of the implementation 900, an initial attempt of the receiving system 104 to play one of the encrypted files 908 triggers the key request 932. If the license provider 912 does not have the hardware identification provided in the key request 932 in a service enabled list of devices maintained by the license provider, the license provider will decline the key request. Once the decryption key 910 has been obtained by the receiving system 104, typically, no further key requests (step 932) are required.

Figure 21:
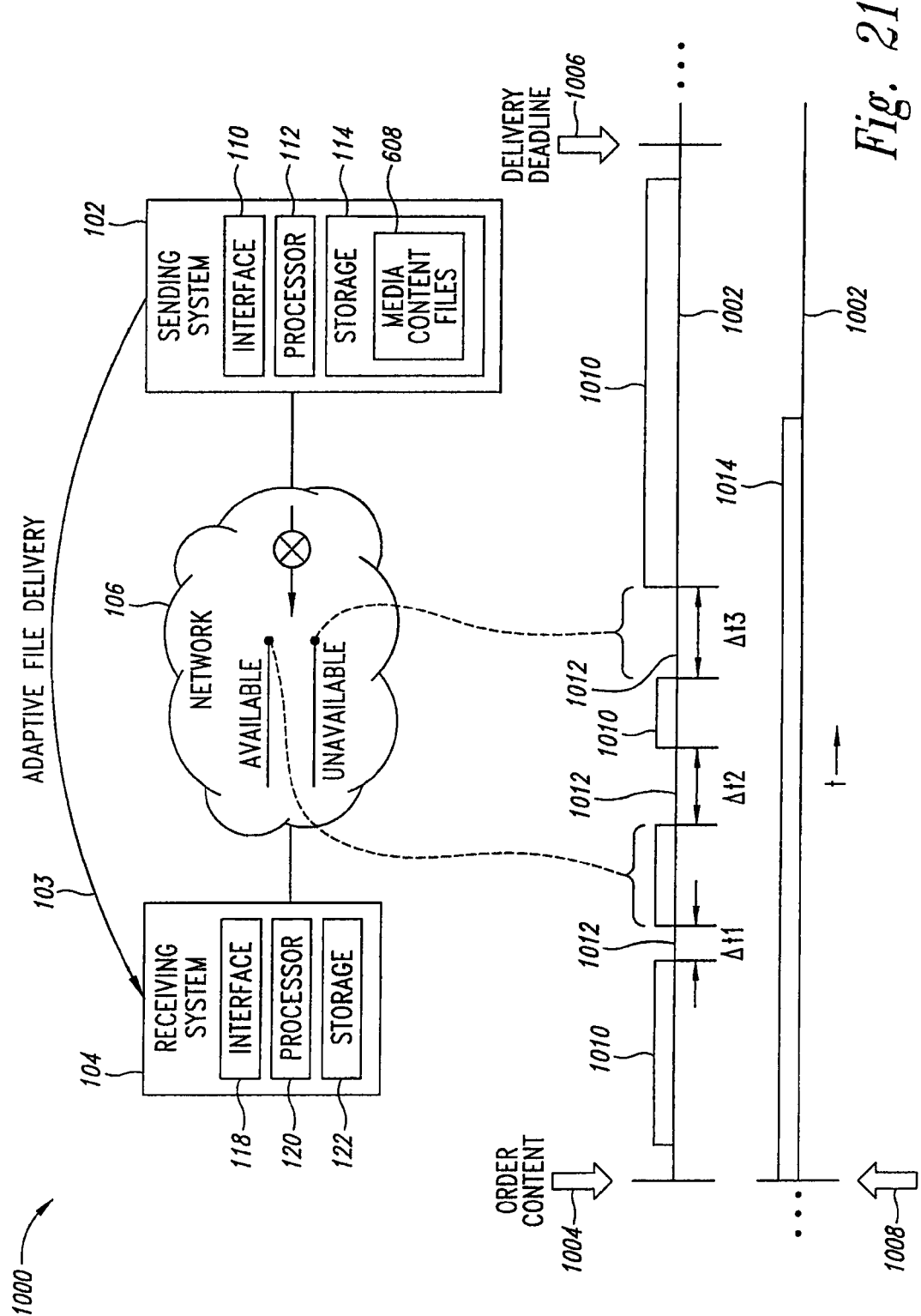
FIG. 21 is a schematic diagram of an implementation of the adaptive file delivery system showing delivery aspects.

An implementation 1000 of the adaptive file delivery system 100 is depicted in FIG. 21 broadly depicting components of the adaptive file delivery system 100 and associated method to further indicate that the adaptive file delivery system and method discussed herein includes more than the particular procedures discussed herein for sending file segments and so on. In general, the adaptive file delivery system 100 and method seek to electronically deliver files in a piecewise fashion by a certain delivery deadline. In some versions, other aspects can include initiating the adaptive file delivery by requesting or by ordering. Further aspects can include playing the received files. Depicted versions of the implementation 1000 operate by time separation along a timeline 1002 including three events in a delivery session: ordering content (step 1004), delivering content by a delivery deadline (step 1006), and playing back the content (step 1008). By separating these events, the sending system 102 can deliver content during network availability 1010 that may be otherwise periodically, and unpredictably, unavailable 1012 for unspecified periods.

The implementation 1000 can include a service provider operating the sending system 104 as a server associated with a library of stored media content files. The sending system 1000 delivers the content files to a collection of the receiving systems 104 representing the service provider's customers. The delivered content files are stored locally at the receiving systems 104 as they are delivered. Ordering of content (step 1004) initiates the delivery phase and can be done by a consumer directly, or by proxy by another person or machine acting on the consumer's behalf. The sending system 102 then calculates an anticipated delivery rate needed to deliver the content file to the client assuming predicted times of network availability 1010 and/or unavailability 1012. The predicted times of network delivery may be based on manually configured profiles, historical measurements of previous periods, trends in network activity, etc.

Sometime during the delivery there may be an unpredicted period where the network is unavailable 1012. When these outages are unanticipated, at the conclusion of the outage, the sending system 102 automatically recalculates the new required delivery rate to achieve the delivery deadline and resumes the delivery of the remaining portion of the media content file. The delivery finishes when the entire file is delivered to the receiving system 104 (step 1006). At an unspecified period after delivery, the receiving system 104 operated by the ordering consumer or other user can play back on the receiving system 104 (step 1014) the locally stored media file in its entirety free from any adverse performance of the delivery network between the receiving system 104 and the sending system 102.

Figure 22:
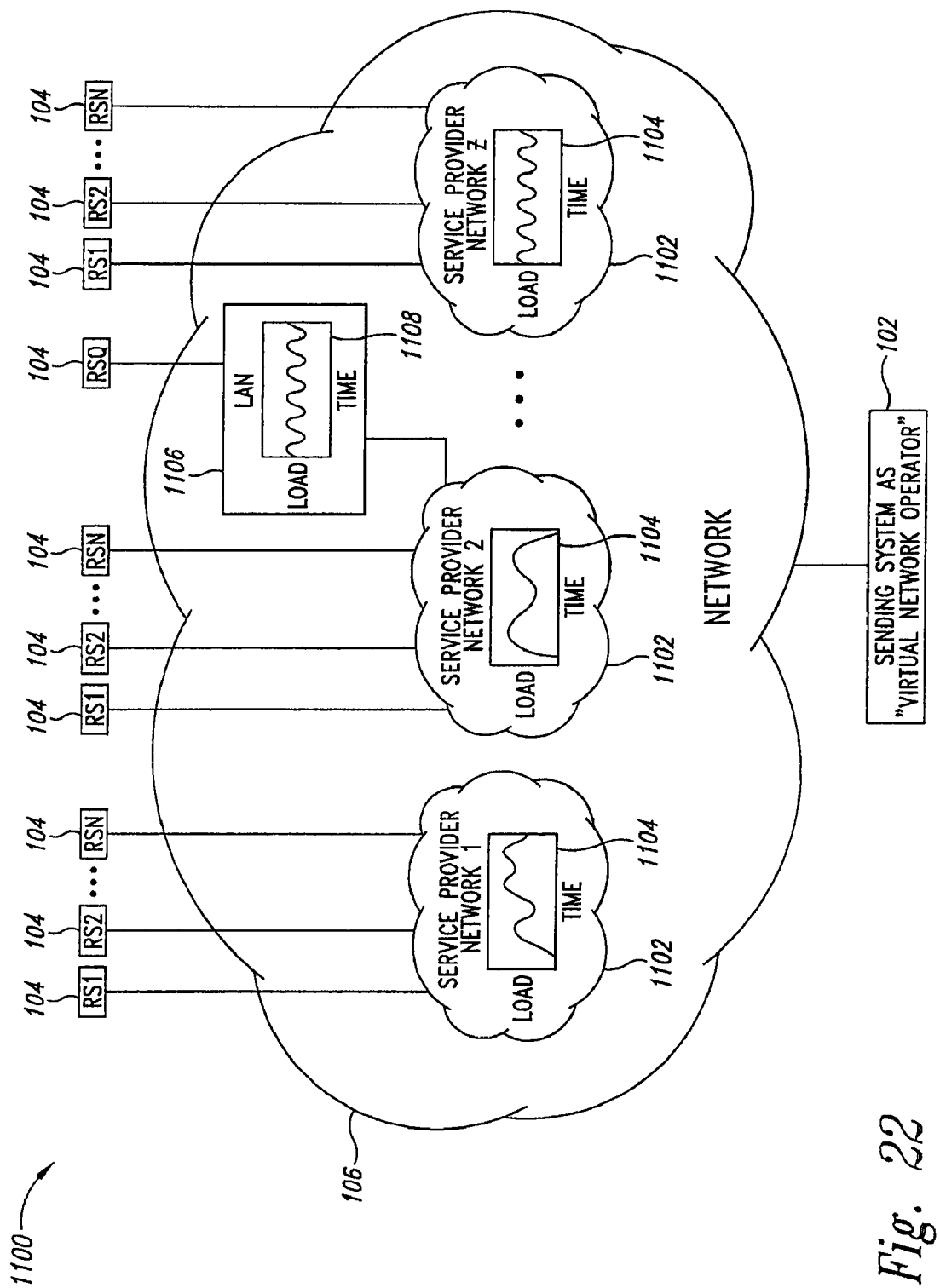
FIG. 22 is a schematic diagram of an implementation of the adaptive file delivery system showing network aspects.

An implementation 1100 is depicted in FIG. 22 wherein the sending system 102 is used as a virtual network operator. Through use of the adaptive file delivery approach, the sending system 102 is able to use the network 106 as containing one or more delivery or service provider networks 1102 each having various different types of network loading profiles 1104 to send large files to large numbers of the receiving system 104.

Further network loading complications can include having LANs 1106 with other loading profiles 1108 linked to one or more of the service provider networks 1102. Despite various network loading complexities, the sending system 102 is able to successfully transmit the large files to meet established delivery deadlines without impacting the service provider networks 1102 to a degree that would disrupt service or motivate expansion of bandwidth on these service provider networks.

In the implementation 1100, the sending system 102 can be used through a virtual network operator arrangement to allow business entities, that may not be related in any contractual manner to network access providers, to establish and operate large media content distribution services over the service provider networks 1102 that have surplus capacity during certain time periods, but not during other periods. In general, the implementation 1100 uses adaptive file delivery to use off-peak network capacity of networks such as the network 106 depicted in FIG. 22, or other networks, between the sending system 102 as virtual network operator and customers, in order to remain within the existing capacity of the networks, without requiring build-out of additional capacity to support the virtual network operator service.

As the virtual network operator, the sending system 102 maintains one or more content servers or other storage devices that store a library of content files that can be accessed by customers. The virtual network operator service can be broadly defined as delivery of media content files to designated users for storage on the user's content storage units (DVR's, PMC's, network-attached storage units, PCs, etc.). Thus, the virtual network operator service is akin to a delivery agent service for businesses that want their content delivered to the businesses' customers.

Implementations of the adaptive file delivery system 100 can include one or more of the receiving systems 104 with mobile capability (e.g. laptop) to be moved between two or more of the service provider networks 1102, the LANs 1106, other networks, and/or IP or network-layer addresses. For instance, a user could connect the user's receiving system 104 to a home access point, which connects to a DSL modem that is communicatively linked through one of the service provider networks 1102. In this case, the network address associated with the receiving system 104 will most likely be the wide area network address of the DSL modem. Continuing with the example, the user then connects the receiving system 104 to one of the LANs 1106, such as a corporate LAN at the user's place of work consequently changing the network address for the receiving system.

Furthermore, suppose the user then connects the receiving system 104 to another one of the service provider networks 1102 or the LANs 1106 via a 3G modem at an airport again changing the type of access network. Through these various changes in network connections provided in the example, the sending system 102 retains in the storage 114 a history of the network loading profile 1104 for the various links established with the receiving system 104 to be used to track the performance for each of these links. Performance tracking can include how well a particular link performs in a no-load or no congestion condition. During operation, the sending system 102 can utilize collected history for a link to determine how to utilize current bandwidth.

Tracking of link performance can be done by the receiving system 104 measuring throughput each time one of the file segments is transferred to the receiving system. The receiving system 104 can then report the measured throughput to the sending system 102. Consequently, the sending system 102 can receive real-time link performance metrics from the receiving system 104.

Specific aspects of the performance tracking can vary upon the implementation. For instance, when the sending system 102 receives a download request from one of the receiving systems 104, the sending system can validate the request. Validation can be done with the electronic serial number (ESN) of the receiving system 104 client machine and customer ID (ID) assigned to the user of the receiving system, but other methods of validation can also be used.

Upon validation, the sending system 102 can then obtain incoming connection source IP address information of the receiving system 104 in a network packet header portion of a download request received by the sending system from the receiving system. The processor 112 of the sending system 102 can then determine if the storage 114 of the sending system already contains a record containing the ESN and the source address associated with the download request. If such a record exists, the processor can update performance information of the record and if such a record does not exist, can create a new record. In some implementations, the sending system 102 can use performance information from one or more existing records that each contain the same source address but an ESN other than the ESN of the download request to help create the new record.

In some implementations link performance is tracked according to a peak bandwidth value for a current file segment transfer so that a record need only be updated when the value for current peak bandwidth is greater than a threshold relative to the value for an historical peak bandwidth previously retained in the record found in the storage 114 of the sending system 102. For instance, if the value for current peak bandwidth is greater than the stored value for historical peak bandwidth, then the value for historical peak bandwidth is replaced by the value for current peak bandwidth.

If the value for current peak bandwidth is greater than an historical threshold such as some percentage of the value for historical peak bandwidth (e.g. greater than 90% of the value for historical peak bandwidth) then the current time is stored in the record to note such occurrence. This can be used on occasion to determine whether the value for an historical peak bandwidth has become irrelevant due to changes in network structure or abandoned network connections. Regardless, the time of the last active download is also recorded in order to prevent a link from expiring during download.

If the value for current peak bandwidth is less than some percentage of the value for historical peak bandwidth, then the record is updated by just replacing the last active download time with the current download time. To create a new record, the sending system 102 can store the source address and the ESN of the receiving system 104 and store the current time as the most recent time that the historical threshold was exceeded. In all cases the last active download time is also recorded in order to prevent a link from expiring during down time. Table 1 depicts a representative example of how the record in the storage 114 of the sending system 102 can be structured.

| ID | ESN | PeakRate | PeakTime | Last90PercentTime | SourceAddr | LastActive |
|----|------|----------|----------|-------------------|----------------|------------|
| 1  | 1234 | 235      | 1234567  | 1234567690        | 76.123.89.112  | 2323234    |
| 2  | 2345 | 978      | 1234567  | 1234567891        | 76.199.10.138  | 2323236    |

Given the approach described above, the sending system 102 can track all new download links and track peak performance of each. Furthermore, the sending system 102 can continue to track performance of the links having established records when the receiving system 104 switches between them. The approach allows the sending system 102 to recognize and note when a particular link has a new lower performance level. Commonly associated records may be used for comparative performance analysis for a particular source address or ESN. Further, more than one of the sending systems 104 can share information of various links to improve link state recognition. Since a link is defined by the source and destination addresses (such as the IP addresses), prior stored information regarding a source address may be useful in creating a record for a new combination of source address and ESN.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method comprising:
beginning a first session to send a file segment of a remaining portion of a file yet to be received by a receiving system between a sending system and the receiving system, the receiving system being connected to a first portion of a network and having a first network address;
during the first session after a first portion of the file segment has been received by the receiving system and a second portion of the file segment has yet to be received by the receiving system, disconnecting the receiving system from the network thereby terminating the first session;
after disconnecting the receiving system from the network, connecting the receiving system to a second portion of the network, the receiving system having a second network address different than the first network address;
after connecting the receiving system to the second portion of the network, automatically initiating a second session to resume sending the second portion of the file segment from the sending system to the receiving system;
receiving the unsent portion of the file segment;
determining an actual transfer rate that the file segment was sent from the sending system to the receiving system based in part on size of the file segment and an elapsed time between when the file segment was sent from the sending system and when the file segment was received at the receiving system;
determining a wait period based in part on the maximum transfer rate, the minimum transfer rate, and the actual transfer rate;
after receiving the file segment at the receiving system, waiting the wait period before sending an acknowledgement message from the receiving system, the acknowledgement message acknowledging receipt of the file segment by the receiving system; and
sending the acknowledgement message from the receiving system.

2. The method of claim 1 wherein the sending system receives the second network address from the receiving system to initiate the second session.

3. The method of claim 1 wherein the sending system receives a request from the receiving system to initiate the second session.

4. The method of claim 1, further including retaining state of the session substantially at the time of disconnection of the receiving system from the network.

5. The method of claim 1 wherein the receiving system uses a count-down timer to initiate sending a request to the sending system to initiate the second session.

6. The method of claim 1 wherein after the second session is initiated, only the second portion of the file segment is sent from the sending system to the receiving system.

7. The method of claim 1, further including sending the unsent portion of the file segment from the sending system to the receiving system during the second session based upon a session state retained in storage of the sending system when the first session is terminated.

8. The method of claim 1 further including sending the unsent portion of the file segment to the receiving system from a sending system other than the sending system.

9. The method of claim 1 wherein the first portion of the network is of a type different than the second portion of the network.

10. A method comprising:
beginning a first session to send a file segment of a remaining portion of a file yet to be received by a receiving system between a sending system and the receiving system, the receiving system being connected to a first portion of a network and having a first network address;
during the first session after a first portion of the file segment has been received by the receiving system and a second portion of the file segment has yet to be received by the receiving system, disconnecting the receiving system from the network thereby terminating the first session;
after disconnecting the receiving system from the network, connecting the receiving system to a second portion of the network, the receiving system having a second network address different than the first network address;
after connecting the receiving system to the second portion of the network, automatically initiating a second session to resume sending the second portion of the file segment from the sending system to the receiving system;
determining a minimum transfer rate for transferring the file segment based in part on a determined size for the remaining portion of the file and an amount of time available to transfer the remaining portion of the file; and
determining a maximum transfer rate for transferring the file segment of the remaining portion of the file based in part on the minimum transfer rate and a maximum transfer capacity of the sending system.

11. A method comprising:
initiating a first session by sending one of a plurality of segments of a file from a sending system to a receiving system, the receiving system being connected to a first portion of a network and having a first network address;
disconnecting the receiving system from the network thereby terminating the first session;
connecting the receiving system to a second portion of the network, the receiving system having a second network address while connected to the second portion of the network;
initiating a second session;
sending another of the plurality of segments of the file from the sending system to the receiving system in the second session;
determining an actual transfer rate that the one of the plurality of segments of the file was sent from the sending system to the receiving system based in part on size and time sent and time received of the one of the plurality of segments of the file;
determining a wait period based in part on the actual transfer rate;
after receiving the one of the plurality of segments of the file at the receiving system, waiting the wait period before sending an acknowledgement message from the receiving system, the acknowledgement message acknowledging receipt of the file segment by the receiving system; and
sending the acknowledgement message from the receiving system from the second network address.

12. The method of claim 11 wherein the first portion of the network is of a different type than the second portion of the network.

13. The method of claim 11 wherein the sending system receives the second network address from the receiving system to begin sending the other of the plurality of segments of the file to the receiving system.

14. The method of claim 11 wherein the sending system receives a request automatically from the receiving system to send the other segment of the file upon connection of the receiving system to the second portion of the network.

15. The method of claim 11, further including retaining information regarding sending the one of the plurality of segments of the file substantially at the time of disconnection of the receiving system from the network.

16. The method of claim 11 wherein after the receiving system is connected to second portion of the network, the other of the plurality of file segments is sent to the receiving system without re-sending the one of the plurality of file segments to the receiving system.

17. The method of claim 11, further including sending the other of the plurality of segments of the file from the sending system to the receiving system based upon a session state retained in storage of the sending system at the time the receiving system is disconnected from the network.

18. The method of claim 11, further including sending the other of the plurality of segments of the file to the receiving system from a sending system other than the sending system.

19. A method comprising:
initiating a first session by sending one of a plurality of segments of a file from a sending system to a receiving system, the receiving system being connected to a first portion of a network and having a first network address;
disconnecting the receiving system from the network thereby terminating the first session;
connecting the receiving system to a second portion of the network, the receiving system having a second network address while connected to the second portion of the network;
initiating a second session;
sending another of the plurality of segments of the file from the sending system to the receiving system in the second session;
determining a minimum transfer rate for transferring the one of the plurality of file segments based in part on a determined size for a remaining portion of the file not already sent and an amount of time available to transfer the remaining portion of the file; and
determining a maximum transfer rate for transferring the one of the plurality of segments of the file based in part on the minimum transfer rate and a maximum transfer capacity of the sending system.

20. A method comprising:
sending a portion of a file made up of a plurality of file segments from a sending system to a receiving system, the sending the portion of the file including sending the file segments one at a time by a plurality of transmissions with a different one of a plurality of wait periods occurring after each transmission;

for each file segment transmissions, determining an actual transfer rate that the file segment was sent from the sending system to the receiving system;

for at least one of the file segment transmissions, receiving the file segment transmission at the receiving system being connected to a first portion of a network having a first network address;

for at least one of the file segment transmissions, receiving the file segment transmission at the receiving system being connected to a second portion of the network having a second network address;

for each file segment transmission to the receiving system having the first network address and having a previous file segment transmission to the first network address, determining size of the file segment to be sent in the file segment transmission to the receiving system having the first network address based in part by the actual transfer rate of the previous file segment transmission to the first network address; and for each file segment transmission to the receiving system having the second network address and having a previous file segment transmission to the second network address, determining size of the file segment to be sent in the file segment transmission to the receiving system having the second network address based in part by the actual transfer rate of the previous file segment transmission to the second network address.

21. The method of claim 20 wherein the first portion of the network is of a different type than the second portion of the network.

* * * * *